US012430465B2

(12) United States Patent
Sarkar

(10) Patent No.: US 12,430,465 B2
(45) Date of Patent: Sep. 30, 2025

(54) METHOD AND ELECTRONIC DEVICE FOR PERSONALIZING USER DATA PRIVACY AND UTILITY

(71) Applicant: Samsung Electronics Co., Ltd., Suwon-si (KR)

(72) Inventor: Amit Sarkar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 18/352,686

(22) Filed: Jul. 14, 2023

(65) Prior Publication Data
US 2024/0070317 A1  Feb. 29, 2024

Related U.S. Application Data

(63) Continuation of application No. PCT/KR2023/007354, filed on May 30, 2023.

(30) Foreign Application Priority Data

Aug. 26, 2022  (IN) .............................. 202241048781

(51) Int. Cl.
*G06F 21/62* (2013.01)
*H04L 9/40* (2022.01)
*H04M 1/72454* (2021.01)

(52) U.S. Cl.
CPC ........ *G06F 21/6245* (2013.01); *H04L 63/102* (2013.01); *H04M 1/72454* (2021.01)

(58) Field of Classification Search
CPC ............ G06F 21/6245; H04M 1/72454; H04L 63/102
See application file for complete search history.

(56) References Cited

U.S. PATENT DOCUMENTS 8,612,891 B2  12/2013  Singh et al.
9,215,548 B2  12/2015  Belani et al.
(Continued)

FOREIGN PATENT DOCUMENTS

WO  2014/053697 A1  4/2014

OTHER PUBLICATIONS

Doffman, Google and Facebook Secretly Track Your Activity on Porn Sites, Microsoft Reports, https://www.forbes.com/sites/zakdoffman/2019/07/19/microsoft-exposes-google-and-facebook-for-secretly-tracking-users-on-major-porn-sites, Jul. 19, 2019.
(Continued)

*Primary Examiner* — Frantz B Jean
(74) *Attorney, Agent, or Firm* — Jefferson IP Law, LLP

(57) ABSTRACT

A method for personalizing user data privacy associated with an application of an electronic device is provided. The method includes monitoring over time one or more user interactions associated with the application of the electronic device. Furthermore, the method includes determining a privacy parameter of the user and a utility preference of the user based on the monitored user interactions. Furthermore, the method includes generating a generic/content specific privacy profile of the user based on the determined privacy parameter of the user and utility preference of the user, determining a privacy protection characteristic of the user based on the generic privacy profile and/or the content specific privacy profile, and generating one or more personalized settings for a future user interaction associated with the application of the electronic device based on the privacy protection characteristic.

19 Claims, 23 Drawing Sheets

(56) References Cited

U.S. PATENT DOCUMENTS

| | | | |
|---|---|---|---|
| 2011/0083013 A1 | 4/2011 | Nice et al. | |
| 2013/0291123 A1* | 10/2013 | Rajkumar | H04L 63/20 |
| | | | 726/28 |
| 2015/0235050 A1 | 8/2015 | Wouhaybi et al. | |
| 2017/0093926 A1 | 3/2017 | Chan et al. | |
| 2018/0349636 A1 | 12/2018 | Bhowmick et al. | |
| 2019/0108353 A1* | 4/2019 | Sadeh | H04L 67/306 |
| 2020/0380171 A1* | 12/2020 | Bonat | H04L 63/1425 |
| 2022/0121779 A1* | 4/2022 | Groth | G06N 20/10 |

OTHER PUBLICATIONS

Neal Ungerleider, The Latest Privacy Risk? Looking Up Medical and Drug Information Online, https://www.fastcompany.com/3042763/privacy-risk-looking-up-medical-health-information-online, Feb. 23, 2015.

Rae Nudson, When targeted ads feel a little too targeted, https://www.vox.com/the-goods/2020/4/9/21204425/targeted-ads-fertility-eating-disorder-coronavirus, Apr. 9, 2020.

International Search Report dated Sep. 11, 2023, issued in International Application No. PCT/KR2023/007354.

Indian Office Action dated Jun. 3, 2025, issued in Indian Patent Application No. 202241048781.

* cited by examiner

FIG. 1A
(RELATED ART)
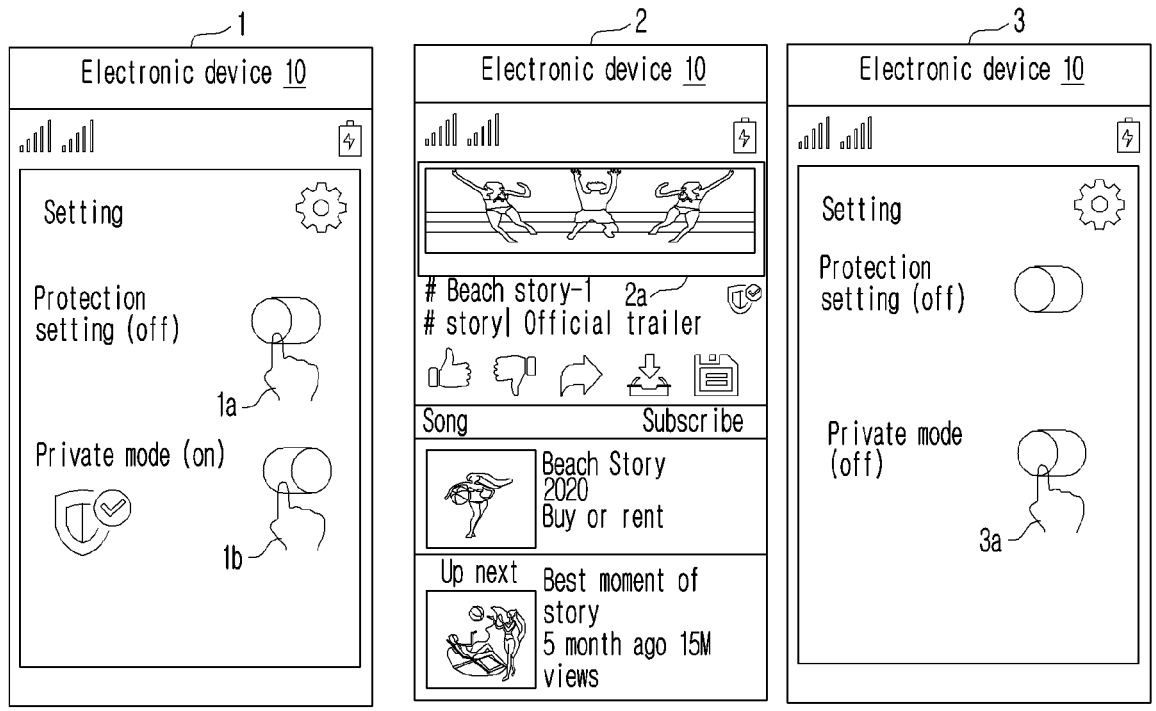
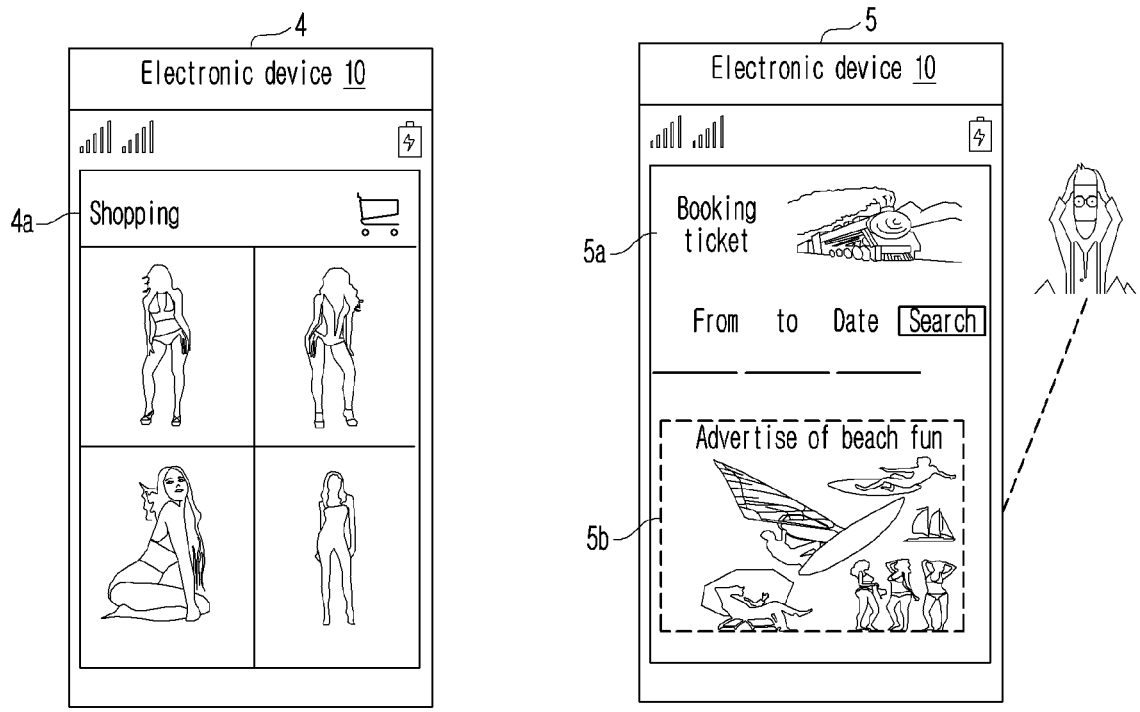

FIG. 1B
(RELATED ART)
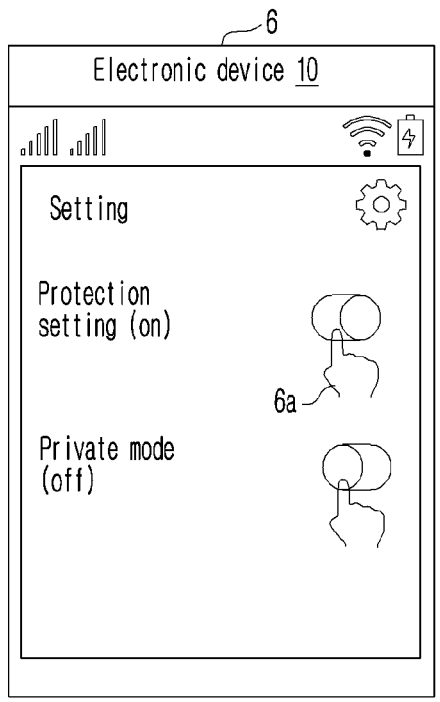
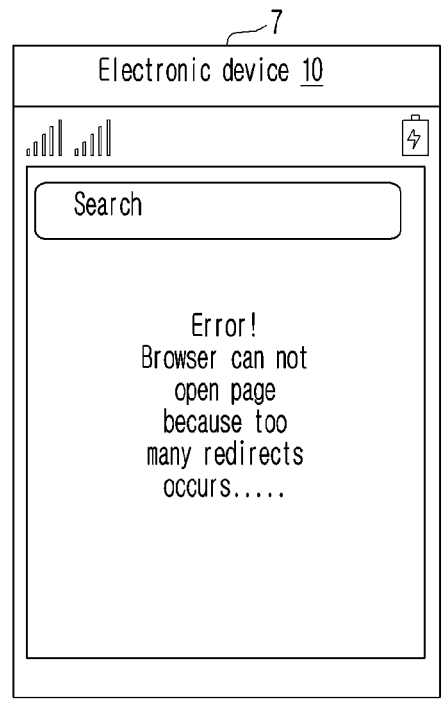
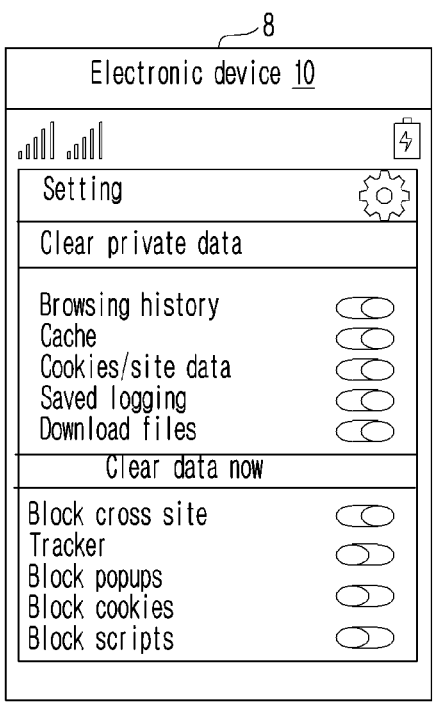
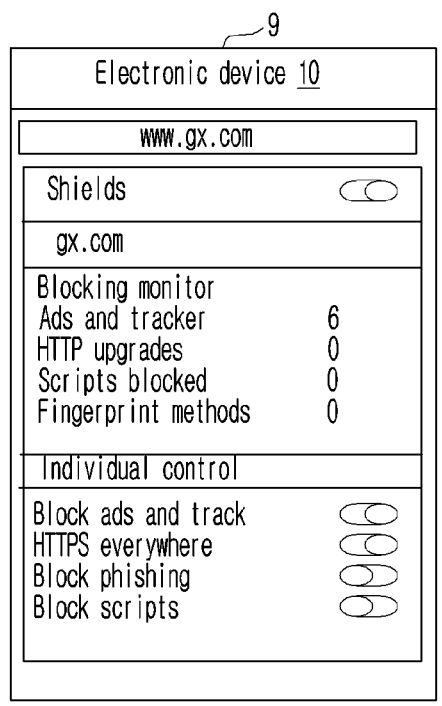

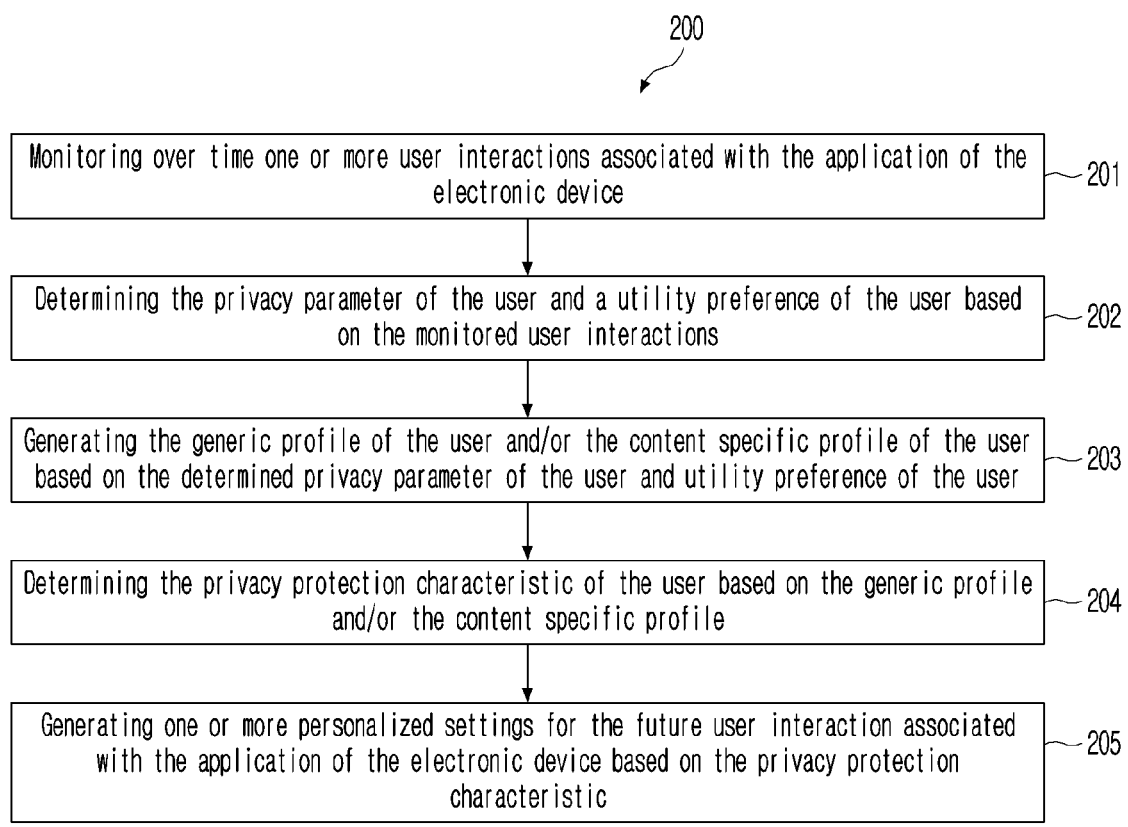

FIG. 4

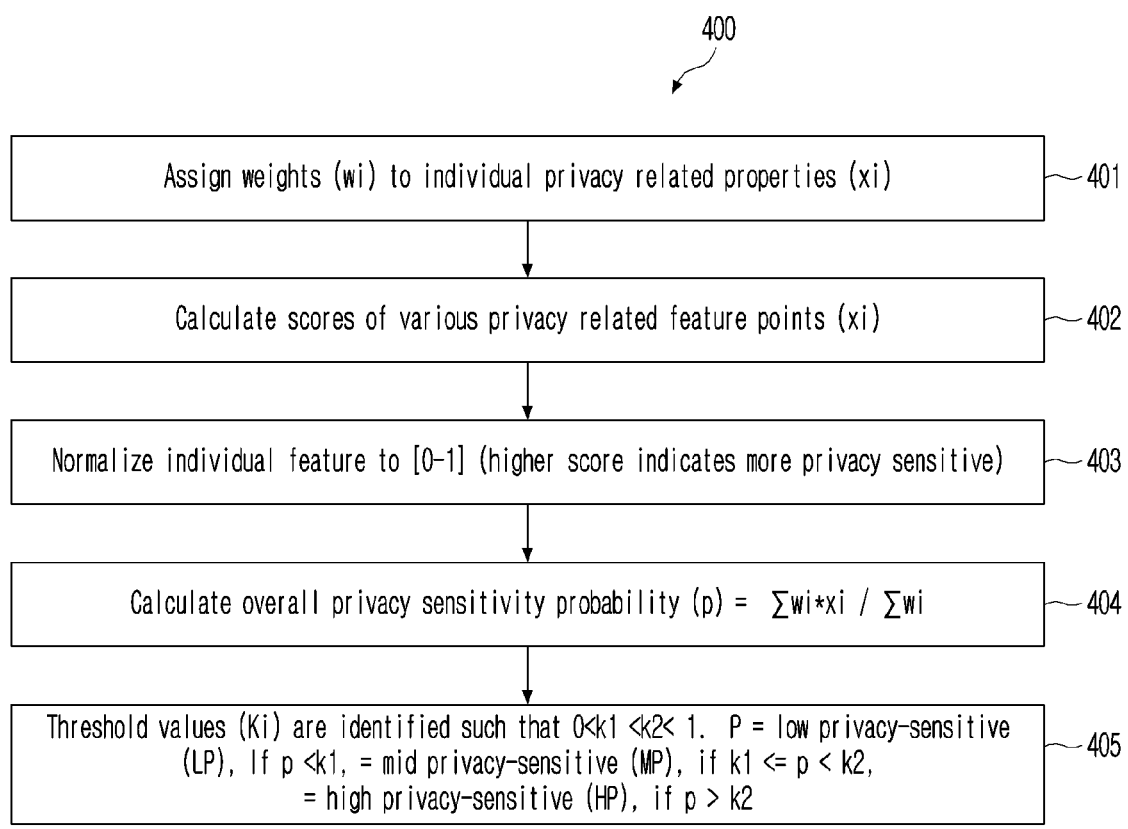

- 400
- Assign weights (wi) to individual privacy related properties (xi) — 401
- Calculate scores of various privacy related feature points (xi) — 402
- Normalize individual feature to [0-1] (higher score indicates more privacy sensitive) — 403
- Calculate overall privacy sensitivity probability (p) = $\sum w_i * x_i / \sum w_i$ — 404
- Threshold values (Ki) are identified such that 0<k1<k2< 1. P = low privacy-sensitive (LP), If p <k1, = mid privacy-sensitive (MP), if k1 <= p < k2, = high privacy-sensitive (HP), if p > k2 — 405

METHOD AND ELECTRONIC DEVICE FOR PERSONALIZING USER DATA PRIVACY AND UTILITY

CROSS REFERENCE TO RELATED APPLICATION(S)

This application is a continuation of PCT/KR2023/007354, filed on May 30, 2023, at the Korean Intellectual Property Receiving Office and claims priority under 35 U.S.C. § 119 to Indian Patent Application No. 202241048781, filed on Aug. 26, 2022 at the Indian Patent Office, the disclosures of each which are incorporated by reference herein in their entireties.

BACKGROUND

1. Field

The disclosure relates to an electronic device. More particularly, the disclosure relates to a method and the electronic device for personalizing user data privacy and utility.

2. Description of Related Art

A mobile application (app) system has grown to become one of the world's largest industries, including millions of app developers and billions of users who utilize the mobile application(s) on a regular basis. According to recent data, each year billions of mobile application(s) downloads by the users, with the most popular app categories being gaming, social networking, entertainment, news, health fitness, and lifestyle. As a result, the users increasingly rely on smartphones for daily activities and demands, processing of personal data through such mobile application(s) is not always obvious to or controllable by the users. Furthermore, understanding how the mobile application(s) actually work is frequently complicated due to dynamic environment of the mobile application(s), and interconnection with many networks and systems (e.g., $3^{rd}$ party servers), making the mobile application(s) even more difficult to evaluate privacy and security characteristics of the users. As a result, a method for protecting data privacy/protection is required for smartphones/mobile application(s)/users.

Certain existing systems provide a data privacy/protection solution for the smartphones/mobile application(s)/users. For example, a browser's private mode, Federated Learning of Cohorts (FLoC), and app-tracking transparency. Whereas the existing solution has various limitations, such as being unable to grasp user privacy preferences and requiring manual selection by the users, which is time-consuming and impractical to accomplish at all times. Another limitation of the existing solution is that permission for the data privacy/protection is only requested at a top-level (e.g., for the entire browser or app), which the users must manually grant or deny. As a result, even with manual control, the users are compelled to choose only one of two options: privacy or utility. Another limitation of the existing solution is that the existing solution forces the users to manually enable/disable privacy settings at a website level without knowing effects. Which also requires the users to visit and change privacy settings for a specific website once before the existing solution can be enforced.

Furthermore, the FLoC tries to mitigate individual user's privacy risk while allowing interest-based advertising on the website by tracking cohorts (groups of users) rather than individuals. However, the FLoC has limitations that it does not comprehend a user's privacy preferences. As a result, all categories of interest are conveyed to advertisement trackers without regard for what the user desires. Furthermore, the app-tracking transparency tries to give users control over their data by providing manual permission prompts or a switch for each application at a platform level to avoid cross-app tracking. However, the app-tracking transparency has a limitation that the users must manually authorize or deny tracking on a per-app basis. The privacy preferences of the users are not automatically recognized. Furthermore, the app-tracking transparency does not solve the fundamental issue that the same app can contain both privacy-sensitive and utility-oriented information. As a result, the users are compelled to choose only one of two options: privacy or utility.

Thus, it is desired to address the above-mentioned disadvantages or other shortcomings or at least provide a useful alternative for personalizing privacy and utility preferences.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for personalizing user data privacy associated with of an application (e.g., web browser, shopping application, etc.) of an electronic device. The method includes automatically personalizing the application based on a generic privacy profile of a user of the electronic device (e.g., a privacy awareness, a privacy risk, a generic privacy sensitivity, and a generic utility preference) and a content-specific profile of the user of the electronic device (e.g., a content-specific privacy profile and a content-specific utility preference). As a result, the method automatically learns users' privacy and utility preferences and configures privacy protections at a customized level for each user, preventing tracking for user-sensitive content while allowing interest-driven recommendations and ads (i.e., advertisement) for non-sensitive and utility content, and hence enhancing user experience.

Additional aspects will be set forth in part in the description which follows and, in part, will be apparent from the description, or may be learned by practice of the presented embodiments.

In accordance with an aspect of the disclosure, a method for personalizing user data privacy and utility associated with an application of an electronic device is provided. The method includes monitoring over time, by the electronic device, one or more user interactions associated with the application of the electronic device. Further, the method includes determining, by the electronic device, a privacy parameter of the user and a utility preference of the user based on the monitored user interactions. Further, the method includes generating, by the electronic device, a generic privacy profile of the user and/or a content specific privacy profile of the user (e.g., automatically personalizing displayed content of a currently viewed page and/or automatically personalizing configurations internally within an application(s), but there is no visual change or personalization of the displayed content) based on the determined privacy parameter of the user and utility preference of the user. Further, the method includes determining, by the electronic device, a privacy protection characteristic of the user based on the generic privacy profile and/or the content specific privacy profile. Further, the method includes generating, by the electronic device, one or more personalized settings for a future user interaction associated with the application of the electronic device based on the privacy protection characteristic.

In an embodiment, the one or more user interactions across the application is determined based on a device context of the electronic device, where the device context includes a type of the electronic device (e.g., smartphone, tablet, television (TV), smart-watch, desktop, etc.), a screen-type of the electronic device (e.g., Large, medium, small, foldable, etc.), and an operating mode of the electronic device (e.g., personal, secret, work, kid, elderly, etc.). The one or more user interactions across the application is determined based on a privacy configuration of the electronic device based on an application-level privacy preference (e.g., secret/private mode usage, anti-tracking features enabled, ad-blocking features, etc.) and/or a platform-level privacy preference (e.g., delete browsing data, data collection allowance, account sync, etc.). The one or more user interactions across the application is determined based on a utility configuration of the electronic device (100) based on an application-level utility preference (e.g., Virtual Private Network (VPN)/Knox protection usage, etc.) and/or a platform-level utility preference (e.g., secret folder/private mode app usage, personalization service enabled, app permissions status (location, storage, mic, camera, etc.), etc.). The one or more user interactions across the application is determined based on an application context of a currently running application of the electronic device.

In an embodiment, the application context of the application of the electronic device is determined based on an application characteristic (e.g., browsing information (history, interaction, interests) of a user-visited application content and/or a utility characteristic (e.g., topics of screen content, topics of search, topics of recommendation, topics of advertisements, etc.) of the user-visited application content. The application context of the application of the electronic device is determined based on the application characteristic displayed on the screen (140) and a service associated with the application. The application context of the application of the electronic device is determined based on a privacy characteristic of a user-installed application and/or a utility characteristic of the user-installed application.

In an embodiment, where one or more user interactions (e.g., tap, double-tap, pinch, scroll, swipe, hardware button press, fold, slide, etc.) across the application is used to identify a user intent and action categories along with user sentiment (e.g., positive, negative, neutral, etc.) towards the application. Further, the method includes identifying a reaction event of the user from the user interaction sequence (e.g., skip-and-continue, retry, refresh, re-launch, change privacy settings, switch-apps, etc.).

User interactions are monitored continuously and a sequence of interactions in a combined form is considered one unit of user action. Such actions are then considered along with app context to identify user intent and sentiment associated as shown in the below operations:

Continuously monitor and record individual user interactions. E.g., touch up/down, swipe left/right, scroll up/down, button press, etc.

Identify the current screen content's event association. E.g., close button, launch menu, skip button, etc.

Associate user interaction sequence along with screen context to classify user action and intent. E.g., User tap on application's close button->Action='Close application', User press on centered HW button->Action='Minimize application', Typing keywords in search input field->Action='Search within application' etc.

Map user action(s) along with app context to identify user intent. E.g., 'close application—1' followed by 'launch application—2' when an error prompt was seen in application—1 and application—1 & application—2 belong to the same category of applications Intent=Switch Apps for functional utility.

Classify user sentiment associated with content or an app scenario. E.g., close application indicates negative sentiment towards application, Switch from browser 1 to browser 2 indicates Negative sentiment towards Browser 1, and positive sentiment towards Browser 2.

In an embodiment, the privacy parameter of the user includes a privacy awareness of the user, a privacy risk of the user, and a privacy sensitivity of the user.

In an embodiment, the privacy awareness of the user is determined based on an application-level privacy preference (e.g., anti-tracking, ad-block, $3^{rd}$ party cookie blocking, etc.), a platform-level privacy preference (e.g., opt-out of personalization, secret folder, VPN mode, ad-blocking apps, etc.), a user interaction over privacy related information (e.g., time spent on articles on privacy, interactions with privacy promotion or dashboard user interface, etc.), and a user behaviour over privacy preferences(e.g., clear browsing data, using secret mode tabs, app permission grants, and denials, changing default privacy settings, etc.).

In an embodiment, the privacy risk of the user is determined based on an application-level privacy preference, a platform-level privacy preference, a user interaction with a third-party service (e.g., comment, share, login, ads, etc.), a user input (e.g., personal information), and a privacy characteristic of a user-visited application content (e.g., privacy-related properties of user visited apps/sites (high/mid tracking)).

In an embodiment, the privacy sensitivity of the user is determined based on a usage of the application-level privacy preference (e.g., anti-tracking, ad-block, etc.), a user interaction over the application-level privacy preference (e.g., $3^{rd}$ party cookie blocking, dashboard, etc.), a usage of the platform-level privacy preference (e.g., opt-out of personalization), a user interaction over the platform-level privacy preference (e.g., secret folder, VPN mode, etc.), a usage of privacy-focused applications, and a privacy-conscious browsing behaviour (e.g., auto clear browsing data, usage ratio of secret mode tabs to normal mode tabs, app or site permission denials, logging out of $3^{rd}$ party services, skip $3^{rd}$ party advertisements, etc.).

In an embodiment, the utility preference of the user is determined based on a usage of application-level privacy preference (e.g., disable anti-tracking, disable ad-block, $3^{rd}$ party cookie allowance, etc.), a usage of platform-level privacy preference (e.g., opt-in of personalization, data sharing allowance, ad-blocking exceptions, etc.), and a utility-oriented browsing behaviour (e.g., keep using same logged-in state in app/sites, app/site permission grants, click or follow interest-driven recommendations or ads, usage of $3^{rd}$ party login services for commenting utility, etc.).

In an embodiment, the content specific privacy profile of the user is determined based on a category of content visited by the user under a specific privacy mode (e.g., websites visited in secret or incognito mode in the browser), a category of application accessed under a device level privacy mode (e.g., secret folder, Knox, etc.), a category of content or application where data permission is restricted by the user (e.g., location, storage or another permission denial in a certain category of content or apps, etc.), and a category of content to which negative user reaction is received (e.g., skip or close ads, a close window for a certain category of content, flip or turn off the screen, etc.).

In an embodiment, the method includes determining a content specific utility preference of the user based on a category of content recommendations to which positive user reaction is received (e.g., the user clicks on interest-driven ads or recommendations, etc.), a category of content shared by the user, a content type where the user reduces or disables privacy protection to access certain functionality of the application (e.g., login functionality, site/app compatibility, commenting on sites with $3^{rd}$ party login, etc.), a type of content where certain permissions are allowed for certain functionality (e.g., cookie allowance, location or storage permission allowance, etc.).

In an embodiment, where generating, by the electronic device, one or more personalized settings for the future user interaction associated with the application of the electronic device based on the privacy protection characteristic includes correlating, by the electronic device, the privacy protection characteristic with the application, generating, by the electronic device, the one or more personalized settings to automatically personalize the at least one application for the future user interaction based on the correlated privacy protection characteristic with the application, where the one or more personalized settings includes a privacy sensitivity configuration and a utility sensitivity configuration.

In an embodiment, where the method includes automatically personalizing, by the electronic device, a displayed content on the screen (140) based on the generic privacy profile and/or the content specific privacy profile and/or a plurality of internal application parameters (e.g., setting, non-display content, etc.) based on the generic privacy profile and/or the content specific privacy profile, where the plurality of internal application parameters does not change the displayed content on the screen.

In accordance with another aspect of the disclosure, an electronic device for personalizing the user data privacy and utility associated with the application of the electronic device is provided. The electronic device includes a privacy and utility controller coupled with a processor and a memory. The privacy and utility controller monitors over time one or more user interactions associated with the application of the electronic device. The privacy and utility controller determines the privacy parameter of the user and the utility preference of the user based on the monitored user interactions. The privacy and utility controller generates the generic privacy profile of the user and/or the content specific privacy profile of the user based on the determined privacy parameter of the user and utility preference of the user. The privacy and utility controller determines the privacy protection characteristic of the user based on the generic privacy profile and/or the content specific privacy profile. The privacy and utility controller generates one or more personalized settings for the future user interaction associated with the application of the electronic device based on the privacy protection characteristic.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1A and 1B illustrate data privacy/protection related problem(s) in certain existing systems, according to the related art;

FIG. 2C is a flow diagram illustrating a method for personalizing user data privacy associated with the application of the electronic device, according to an embodiment of the disclosure;

FIG. 4 is a flow diagram illustrating a method for determining a privacy sensitivity level and a privacy sensitivity class, according to an embodiment of the disclosure;

Throughout the drawings, it should be noted that like reference numbers are used to depict the same or similar elements, features, and structures.

DETAILED DESCRIPTION

Figure 2A:
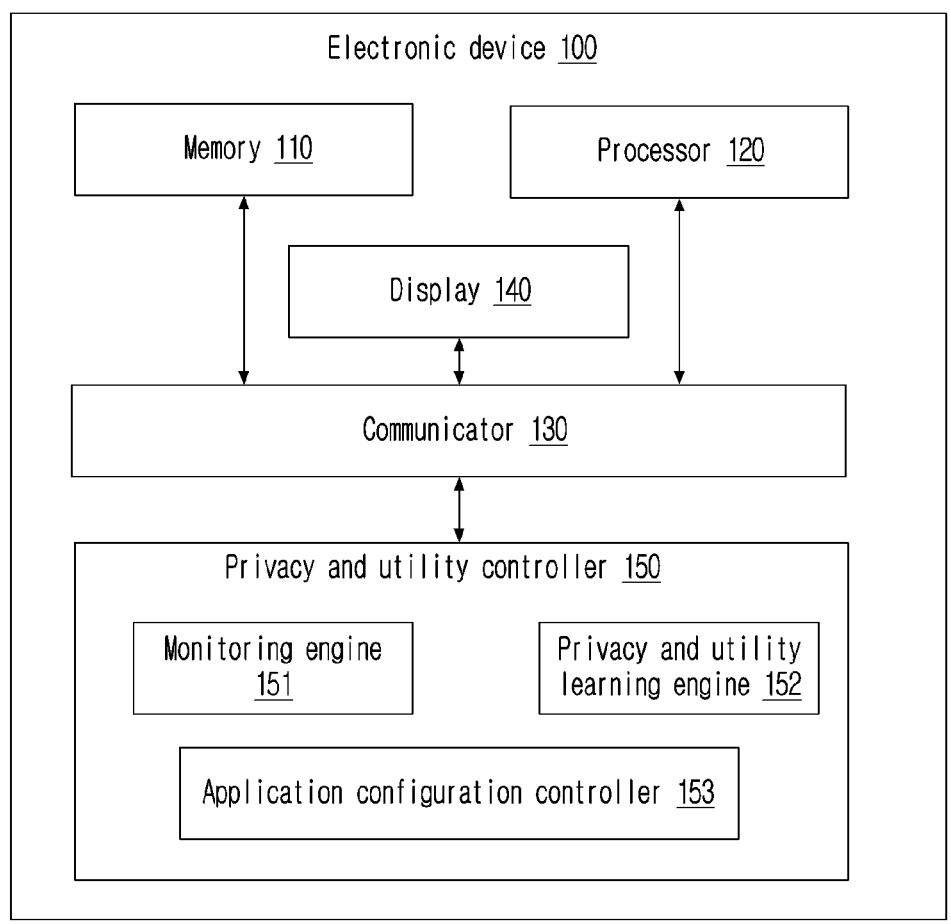
FIG. 2A illustrates a block diagram of an electronic device for personalizing user data privacy associated with an application of the electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surface.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "data" and "content" are used interchangeably and means the same. The terms "webpage" and "online page" are used interchangeably and means the same. The terms "site" and "website" are used interchangeably and means the same. The terms "application" and "app" are used interchangeably and means the same. The terms "characteristic" and "properties" are used interchangeably and means the same.

FIGS. 1A and 1B illustrate data privacy/protection related problem(s) in certain existing systems, according to the related art.

Referring to FIG. 1A, consider a day one scenario in which a protection setting of a browser application of a user of an electronic device (10) is turned off by default (1a) and the user uses a private mode (1b) (or secure folder) (1) in the browser application to visit certain types of sensitive websites/video applications (2a) (e.g., watching beach story video, adult content, etc.) (2) using the browser application, So that browsing history is not retained. After a while, the user disables (3a) the private mode (or secure folder) (3) and resumes browsing the e-commerce website/application (e.g., shopping application) in normal mode. While exploring the e-commerce website/application (4a), the user spent some time searching through the shopping-adult and intimate category (4). On day two, the user wishes to purchase rail tickets (5a) for his/her family members. The user opens a train ticket buying webpage in front of everyone and begins looking for railway tickets. Suddenly, some adult product and innerwear advertisements (5b) appeared on the train ticket buying webpage (5). Because of a previous visit to an e-commerce website/application (adult shopping), the existing system(s) identifies the interest of the user, which was shared with $3^{rd}$ party trackers because the protection setting was turned off. As a result, the user was ashamed in front of his/her family members as the existing system(s) do not understand the user's privacy sensitivity and utility-sensitivity profile, which is a limitation of the existing system(s).

Referring to FIG. 1B, Consider a scenario (6) in which the user of the electronic device (10) manually activates the protective setting (6a) of the browser application. In this scenario (6), where the user searches for a rent house on the browsing application for last several days. In a present-day, the user may not receive available offers related to user's past interest from $3^{rd}$ party recommenders or advertisement providers because the protection setting was enabled. Due to privacy protection from $3^{rd}$ parties, they are unaware of the user's interests and become less effective or do not provide recommendations based on user's interests, which is another limitation of the existing system(s). Consider a scenario (7) in which the user of the electronic device (10) manually activates the browser application's protective setting. In this scenario (7), the user is unable to log in to third parties' apps/sites (for example, social media like/comment does not work) because the user has activated maximum privacy protection/the protective setting. As a result, third parties services are broken, which is another limitation of the existing system (s).

Consider a scenario (8) in which the user of the electronic device (10) manually activates/deactivates the browser application's protection configuration (e.g., browsing history, cache, block popups, etc.). The existing system (s) has a binary option, i.e., on or off, for any privacy protection configuration. Such options apply same privacy protection for all websites. Another limitation of the current system is that the user must pick between privacy and functionality (s). Furthermore, the existing system (s) (9) provides a site/app level on/off control which is very manual and tedious, yet not effective on fresh content as there is no learning from the user's past actions.

Furthermore, different users have varying levels of privacy-sensitivity. Some are more concerned with privacy (e.g., senior users), whereas others are more concerned with utility (e.g., younger users). For the same individual, privacy sensitivity can vary based on the type of content (e.g., adult product vs. smartphone). Similarly, different users may have different privacy sensitivities for the same material (e.g., conservative vs. liberal, search phrases for 'pregnancy test kit' for a teenage girl vs. a doctor). Furthermore, user privacy awareness differs for different regions or societies in general (e.g., European users vs. Indian users). So, a suitable alternative for personalizing privacy and utility framework is required.

Accordingly, embodiments herein disclose a method for personalizing user data privacy associated with an application of an electronic device. The method includes monitoring over time, by the electronic device, one or more user interactions associated with the application of the electronic device. Further, the method includes determining, by the electronic device, a privacy parameter of the user and/or a utility preference of the user based on the monitored user interactions. Further, the method includes generating, by the electronic device, a generic privacy profile of the user and/or a content specific privacy profile of the user (e.g., automatically personalizing displayed content of a currently viewed page and/or automatically personalizing configurations internally within an application(s), but there is no visual change or personalization of the displayed content) based on the determined privacy parameter of the user and utility preference of the user. Further, the method includes determining, by the electronic device, a privacy protection characteristic of the user based on the generic privacy profile and/or the content specific privacy profile. Further, the method includes generating, by the electronic device, one or more personalized settings for a future user interaction associated with the application of the electronic device based on the privacy protection characteristic.

Accordingly, embodiments herein disclose the electronic device for personalizing the user data privacy and utility associated with the application of the electronic device. The electronic device includes a privacy and utility controller coupled with a processor and a memory. The privacy and utility controller monitors over time one or more user interactions associated with the application of the electronic device. The privacy and utility controller determines the privacy parameter of the user and/or the utility preference of the user based on the monitored user interactions. The privacy and utility controller generates the generic privacy profile of the user and/or the content specific privacy profile of the user based on the determined privacy parameter of the user and utility preference of the user. The privacy and utility controller determines the privacy protection characteristic of the user based on the generic privacy profile and/or the content specific privacy profile. The privacy and utility controller generates one or more personalized settings for the future user interaction associated with the application of the electronic device based on the privacy protection characteristic.

Unlike existing methods and systems, the proposed method allows the electronic device to personalize user data privacy associated with the application (e.g., web browser, shopping application, etc.) of the electronic device. The method includes automatically personalizing the application based on the generic privacy profile of the user of the electronic device (e.g., a privacy awareness, a privacy risk, a generic privacy sensitivity, and a generic utility preference) and the content-specific profile of the user of the electronic device (e.g., a content-specific privacy profile and a content-specific utility preference). As a result, the electronic device automatically learns users' privacy and utility preferences and configures privacy protections at a customized level for each user, preventing tracking for user-sensitive content while allowing interest-driven recommendations and ads for non-sensitive and utility content, and hence enhancing user experience.

Referring now to the drawings, and more particularly to FIGS. 2A, 2B, 2C, 3A, 3B, 3C, 3D, 3E, 3F, 3G, 3H, 3I, 3J, 3K, 4, 5, 6, 7A, 7B, 8, and 9, where similar reference characters denote corresponding features consistently throughout the figures, there are shown preferred embodiments.

FIG. 2A illustrates a block diagram of an electronic device for personalizing user data privacy associated with an application of the electronic device, according to an embodiment of the disclosure. Examples of the electronic device (100) include, but are not limited to a smartphone, a tablet computer, a Personal Digital Assistance (PDA), an Internet of Things (IoT) device, a wearable device, etc.

Referring to FIG. 2A, the electronic device (100) includes a memory (110), a processor (120), a communicator (130), a display (140) (e.g., screen), and a privacy and utility controller (150).

In an embodiment, the memory (110) stores a generic privacy profile, and a content specific privacy profile. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), and the privacy and utility controller (150). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g., server, etc.) via one or more networks (e.g., radio technology). The communicator (130) includes an electronic circuit specific to a standard that allows wired or wireless communication. The display (140) is configured for displaying the content on a screen (140) of the electronic device (100).

The privacy and utility controller (150) is implemented by processing circuitry such as logic gates, integrated circuits, microprocessors, microcontrollers, memory circuits, passive electronic components, active electronic components, optical components, and hardwired circuits, or the like, and may optionally be driven by firmware. The circuits may, for example, be embodied in one or more semiconductor chips, or on substrate supports such as printed circuit boards and the like.

In an embodiment, the privacy and utility controller (150) includes a monitoring engine (151), a privacy and utility learning engine (152), and an application configuration controller (153).

In an embodiment, the monitoring engine (151) monitors over time one or more user interactions associated with the application of the electronic device (100). The one or more user interactions across the at least one application is used to identify a user intent and action categories along with user sentiment towards the at least one application. The monitoring engine (151) determines a device context of the electronic device (100), where the device context includes a type of the electronic device (100), a screen-type of the electronic device (100), and an operating mode of the electronic device (100). The monitoring engine (151) determines a privacy configuration of the electronic device (100) based on an application-level privacy preference and/or a platform-level privacy preference. The monitoring engine (151) determines a utility configuration of the electronic device (100) based on an application-level utility preference and/or a platform-level utility preference. The monitoring engine (151) determines an application context of a currently running application of the electronic device (100).

The monitoring engine (151) determines an application characteristic of a user-visited application content and/or a utility characteristic of the user-visited application content. The monitoring engine (151) determines the application characteristic displayed on the screen (140) and a service associated with the application. The monitoring engine (151) determines a privacy characteristic of a user-installed application and/or a utility characteristic of the user-installed application.

In an embodiment, the privacy and utility learning engine (152) determines a privacy parameter of the user and a utility preference of the user based on the monitored user interactions. The privacy parameter of the user includes a privacy awareness of the user, a privacy risk of the user, and a privacy sensitivity of the user.

The privacy awareness of the user is determined based on at least one of the application-level privacy preference, the platform-level privacy preference, a user interaction over privacy related information, or a user behaviour over privacy preferences. Cross Platform, Java Platform, Windows Platform, macOS Platform, Unix Platforms, and Linux Platforms are examples of platform levels. The privacy risk of the user is determined based on at least one of an application-level privacy preference, a platform-level privacy preference, a user interaction with a third-party service, a user input, or a privacy characteristic of a user-visited application content. The privacy sensitivity of the user is determined based on at least one of a usage of the application-level privacy preference, a user interaction over the application-level privacy preference, a usage of the platform-level privacy preference, a user interaction over the platform-level privacy preference, a usage of privacy-focused applications, or a privacy-conscious browsing behaviour. The utility preference of the user is determined based on at least one of a usage of application-level privacy preference, a usage of platform-level privacy preference, or a utility-oriented browsing behaviour.

The privacy and utility learning engine (152) generates a generic privacy profile of the user and/or a content specific privacy profile of the user based on the determined privacy parameter of the user and utility preference of the user, where the content specific privacy profile includes a content specific privacy profile of the user and a content specific utility preference of the user.

The content specific privacy profile of the user is determined based on at least one of a category of content visited by the user under a specific privacy mode, a category of application accessed under a device level privacy mode, a category of content or application where data permission is restricted by the user, or a category of content to which negative user reaction is received. The content specific utility preference of the user is determined based on at least one of a category of content recommendations to which positive user reaction is received, a category of content shared by the user, a content type where the user reduces or disables privacy protection to access certain functionality of the at least one application, a type of content where certain permissions are allowed for certain functionality.

In an embodiment, the application configuration controller (153) determines a privacy protection characteristic of the user based on the generic privacy profile and/or the content specific privacy profile. The application configuration controller (153) correlates the privacy protection characteristic with the application. The application configuration controller (153) generates the one or more personalized settings to automatically personalize the at least one application for the future user interaction based on the correlated privacy protection characteristic with the application, where the one or more personalized settings includes a privacy sensitivity configuration and a utility sensitivity configuration. The application configuration controller (153) automatically personalize a displayed content on the screen (140) based on the generic privacy profile and the content specific privacy profile and a plurality of internal application parameters based on the generic privacy profile and the content specific privacy profile, where the plurality of internal application parameters does not change the displayed content on the screen (140). Various functionalities of the privacy and utility controller (150) is described in detail in FIG. 2B and FIGS. 3A-3K.

At least one of the plurality of modules/components of the FIG. 2A may be implemented through an artificial intelligence (AI) model. A function associated with the AI model may be performed through corresponding memory (110) and the processor (120).

The one or a plurality of processors controls the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2A shows various hardware components of the electronic device (100) but it is to be understood that other embodiments are not limited thereon. In various embodiments, the electronic device (100) may include less or more number of components. Further, the labels or names of the components are used only for illustrative purpose and does not limit the scope of the disclosure. One or more components can be combined together to perform the same or substantially similar function to personalize user data privacy associated with the application of the electronic device (100).

Figure 2B:
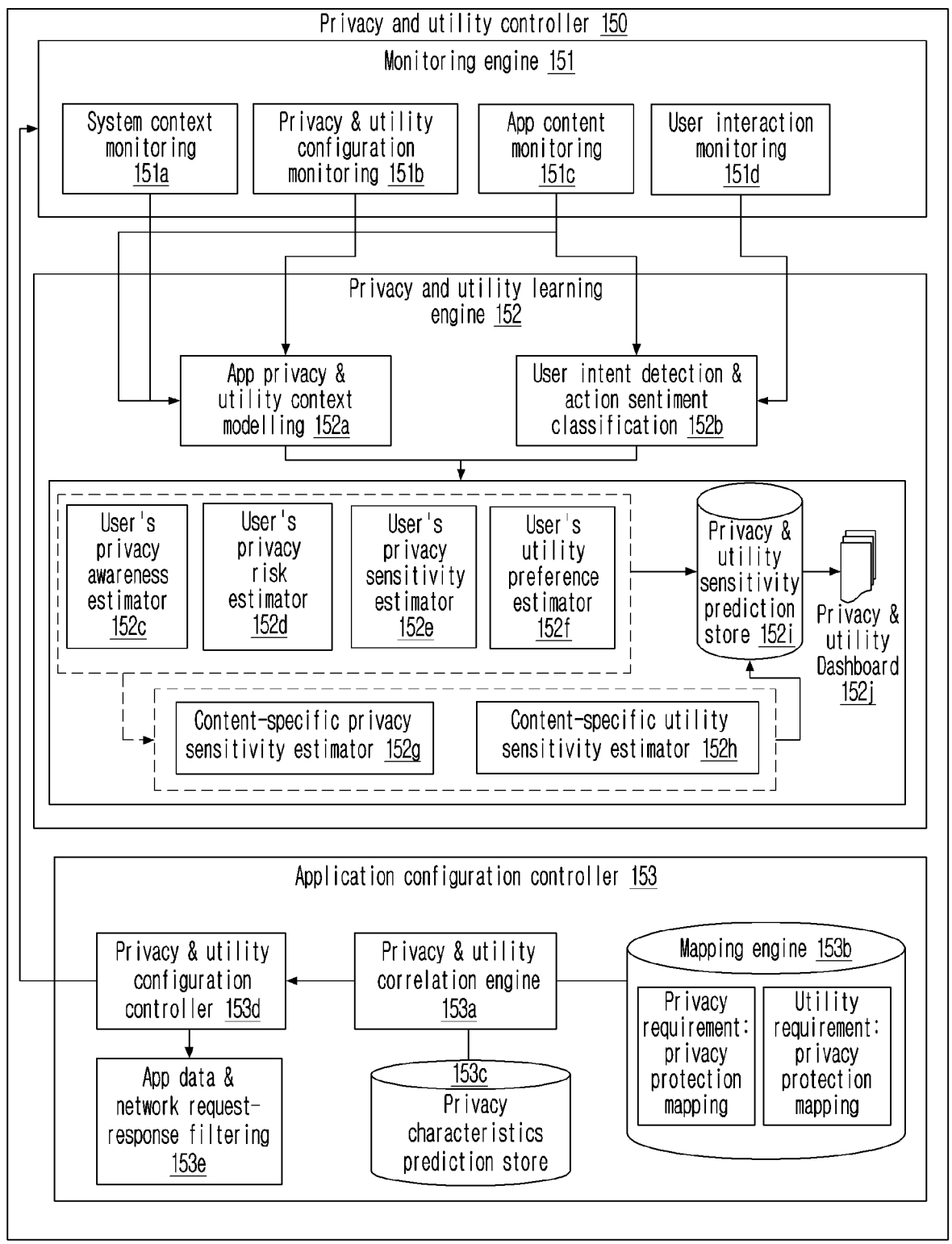
FIG. 2B illustrates a block diagram of a privacy and utility controller for personalizing user data privacy associated with the online page of an application of an electronic device, according to an embodiment of the disclosure.

FIG. 2B illustrates a block diagram of a privacy and utility controller for personalizing user data privacy associated with an application of an electronic device, according to an embodiment of the disclosure.

Referring to FIG. 2B, the privacy and utility controller (150) includes the monitoring engine (151), the privacy and utility learning engine (152), and the application configuration controller (153). The monitoring engine (151) includes a system context monitoring (151a), a privacy and utility configuration monitoring (151b), an app content monitoring (151c), and a user interaction monitoring (151d).

The system context monitoring (151a) determines a device context. The device context includes a type of the electronic device (100) (e.g., smartphone, tablet, television (TV), smart-watch, desktop, etc.), a screen-type of the electronic device (100) (e.g., large, medium, small, foldable, etc.), and an operating mode of the electronic device (100) (e.g., personal, secret, work, kid, elderly, etc.).

The privacy and utility configuration monitoring (151b) determines a privacy configuration and a utility configuration of application level (e.g., browser). For example, a secret and private mode usage (Percentage of 'sites visited'/ 'browsing time spent' in private mode), an anti-tracking feature enabled (0-N), Other Privacy-Security feature usage (0-N), Privacy related extensions (0-N), Ad-blocking features (0-N), delete browsing data (0-N (how many times), data collection allowance (0-N), Account sync (Yes/No), Site permissions status (Cookies, sensors, storage, popup) (0-1 (Normalized, =k/n, k permissions granted out of total n)), etc.

The privacy and utility configuration monitoring (151b) determines a privacy configuration and a utility configuration of platform level. For example, VPN/Knox Protection usage (Yes/No), secret folder/private mode app usage (0-N), personalization service enabled (Yes/No), reset advertising ID (0-N (how many times)), Opt-out of Ad personalization (Yes/No), Opt out to receive marketing information (Yes/No), App permissions status (location, storage, mic, camera, etc.) (0-1 (Normalized, =k/n, k permissions granted out of total n)), etc.

The app content monitoring (151c) determines a currently running application context. The currently running application context includes a privacy characteristic and utility characteristic (e.g., browsing information (history, interaction, interests) leakage characteristics to $3^{rd}$ party, sensor data access request and access per website, privacy-setting specific breakage types in the sites, etc. for a browser application), application content and service properties (e.g., topics of screen content, topics of search, topics of recommendation, topics of advertisements, etc.) of a user-visited application content, an application characteristic displayed on the screen (140) of the electronic device (100), a service associated with the application, and a privacy characteristic and utility characteristic of a user-installed application.

The user interaction monitoring (151d) determines user interaction (e.g., tap, double-tap, pinch, scroll, swipe, hardware button press, fold, slide, etc.) across the application(s) and the user interaction monitoring (151d) is used to identify a user intent and action categories along with user sentiment towards (e.g., positive, negative, neutral, etc.) the displayed content on the screen (140) of the electronic device (100). Further, the user interaction monitoring (151d) identifies a reaction event of the user from the user interaction sequence (e.g., skip-and-continue, retry, refresh, re-launch, change privacy settings, switch-apps, etc.).

In an embodiment, the privacy and utility learning engine (152) includes an app privacy and utility context modelling (152a), a user intent detection and action sentiment classification (152b), a user's privacy awareness estimator (152c), a user's privacy risk estimator (152d), a user's privacy sensitivity estimator (152e), a user's utility preference estimator (152f), a content-specific privacy sensitivity estimator (152g), a content-specific utility sensitivity estimator (152h), a privacy and utility sensitivity prediction database (152i), and a privacy & utility dashboard (152j).

The app privacy and utility context modelling (152a) receives input from the system context monitoring (151a), the privacy and utility configuration monitoring (151b), and the app content monitoring (151c). Furthermore, the app privacy and utility context modelling (152a) determines features about content's (app/websites) privacy-related properties and users' content-specific privacy and utility requirements.

The user intent detection and action sentiment classification (152b) receives an input from the app content monitoring (151c) and the user interaction monitoring (151d). Furthermore, the user intent detection and action sentiment classification (152b) determines user gestures associated with content properties, which are monitored to identify the user intent and the action categories along with user sentiment towards the content.

The user's privacy awareness estimator (152c) determines a privacy awareness of the user based on the application-level privacy preference (e.g., anti-tracking, ad-block, $3^{rd}$ party cookie blocking, etc.), the platform-level privacy preference (e.g., opt-out of personalization, secret folder, Virtual Private Network (VPN) mode, ad-blocking apps, etc.), a user interaction over privacy related information (e.g., time spent on articles on privacy, interactions with privacy promotion or dashboard user interface, etc.), and a user behaviour over privacy preferences (e.g., clear browsing data, using secret mode tabs, app permission grants, and denials, changing default privacy settings, etc.).

The user's privacy risk estimator (152d) determines a privacy risk of the user based on an application-level privacy preference, a platform-level privacy preference, user interaction with third-party service (e.g., comment, share, login, ads, etc.), a user input (e.g., personal information), and a privacy characteristic of a user-visited application content (e.g., privacy-related properties of user visited apps/sites (high/mid tracking)).

The user's privacy sensitivity estimator (152e) determines a privacy sensitivity of the user based on a usage of application-level privacy preference (e.g., anti-tracking, ad-block, etc.), a user interaction over application-level privacy preference (e.g., $3^{rd}$ party cookie blocking, dashboard, etc.), a usage of platform-level privacy preference (e.g., opt-out of personalization), a user interaction over platform-level privacy preference (e.g., secret folder, VPN mode, etc.), a usage of privacy-focused applications, and a privacy—conscious browsing behaviour (e.g., auto clear browsing data, usage ratio of secret mode tabs to normal mode tabs, app or site permission denials, logging out of $3^{rd}$ party services, skip $3^{rd}$ party advertisements, etc.).

The user's utility preference estimator (152f) determines a utility preference of the user is determined based on a usage of application-level privacy preference (e.g., disable anti-tracking, disable ad-block, $3^{rd}$ party cookie allowance, etc.), a usage of platform-level privacy preference (e.g., opt-in of personalization, data sharing allowance, ad-blocking exceptions, etc.), and a utility-oriented browsing behaviour (e.g., keep using same logged-in state in app/sites, app/site permission grants, click or follow interest-driven recommendations or ads, usage of $3^{rd}$ party login services for commenting utility, etc.).

The content-specific privacy sensitivity estimator (152g) determines a content specific privacy profile of the user based on a category of content visited by the user under a specific privacy mode (e.g., websites visited in secret or incognito mode in the browser), a category of application accessed under a device level privacy mode (e.g., secret folder, Knox, etc.), a category of content or application where data permission is restricted by the user (e.g., location, storage or another permission denial in a certain category of content or apps, etc.), and category of content to which negative user reaction is received (e.g., skip or close ads, a close window for a certain category of content, flip or turn off the screen (140), etc.).

The content-specific utility sensitivity estimator (152h) determines a content specific utility preference of the user based on a category of content recommendations to which a positive user reaction is received (e.g., the user clicks on interest-driven ads or recommendations, etc.), a category of content shared by the user, a content type where the user reduces or disables privacy protection to access certain functionality of the displayed content (e.g., login functionality, site/app compatibility, commenting on sites with $3^{rd}$ party login, etc.), a type of content where certain permissions are allowed for displayed content functionality (e.g., cookie allowance, location or storage permission allowance, etc.).

The privacy and utility sensitivity prediction database (152i) and the privacy and utility dashboard (152j) store generic sensitivity labels for the user (i.e., the privacy awareness, the privacy risk, the generic privacy sensitivity, the generic utility preference), and a content specific sensitivity label for pair of user and content type (i.e., the content specific privacy profile, and the content specific utility preference).

In another embodiment, the application configuration controller (153) includes a privacy and utility correlation engine (153a), a mapping engine (153b), a privacy characteristics prediction store (153c), a privacy and utility configuration controller (153d), and an app data and network request-response filtering (153e).

The privacy and utility correlation engine (153a) determines a privacy protection characteristic of the user based on the generated feature, the determined content specific privacy profile, and the determined content specific utility preference of the user by correlating the privacy and utility requirement with the current application context using the mapping engine (153b). Then, the privacy and utility correlation engine (153a) stores and updates the mapping of application context to privacy protection configurations in the privacy characteristics prediction store (153c). The privacy and utility configuration controller (153d) generates one or more personalized settings for future user interaction based on privacy protection characteristics, where the one or more personalized settings includes a privacy sensitivity configuration and a utility sensitivity configuration. The app data and network request-response filtering module (153e) automatically modifies data communication within and across the applications which personalizes the displayed content on the screen (140) of the electronic device (100) based on one or more generated personalized settings.

The mapping between privacy (and utility) requirements and privacy (and utility) configurations is referred to as privacy protection characteristics. A privacy configuration is when a set of privacy protection features are set to a specific value (e.g., on, off, low/mid/high levels, etc.). For example, when browsing online, user A's privacy requirement is that his medical app/site visits not be shared with third parties. '$3^{rd}$ party cookie blocking,' '$3^{rd}$ party data filtering,' '1st party data clearing,' and other privacy protection features could be used in this case. For medical category content, some of these features must be turned on or off. This user A's privacy configuration mapping for medical content is an example of a privacy protection feature.

Although the FIG. 2B shows various hardware components of the privacy and utility controller (150) but it is to be understood that other embodiments are not limited thereon. In other embodiments, the privacy and utility controller (150) may include less or more number of components. Further, the labels or names of the components are used only for illustrative purpose and does not limit the scope of the disclosure. One or more components can be combined together to perform the same or substantially similar function to personalize user data privacy associated with the displayed content of the application of the electronic device (100).

FIG. 2C is a flow diagram illustrating a method for personalizing user data privacy associated with an application of an electronic device, according to an embodiment as disclosed herein. Operations 201 to 205 are performed by the electronic device (100).

Referring to FIG. 2C, at operation 201 of flow diagram 200, the method includes monitoring over time one or more user interactions associated with the application of the electronic device (100). At operation 202, the method includes determining the privacy parameter of the user and the utility preference of the user based on the monitored user interactions. At operation 203, the method includes generating the generic privacy profile of the user and/or the content specific privacy profile of the user based on the determined privacy parameter of the user and utility preference of the user. At operation 204, the method includes determining the privacy protection characteristic of the user based on the generic privacy profile and/or the content specific privacy profile. At operation 205, the method includes generating one or more personalized settings for the future user interaction associated with the application of the electronic device (100) based on the privacy protection characteristic.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the disclosure.

FIGS. 3A, 3B, 3C, 3D, 3E, 3F, 3G, 3H, 3I, 3J, and 3K illustrate various functionality of a privacy and utility controller, according to various embodiments of the disclosure.

Figure 3A:
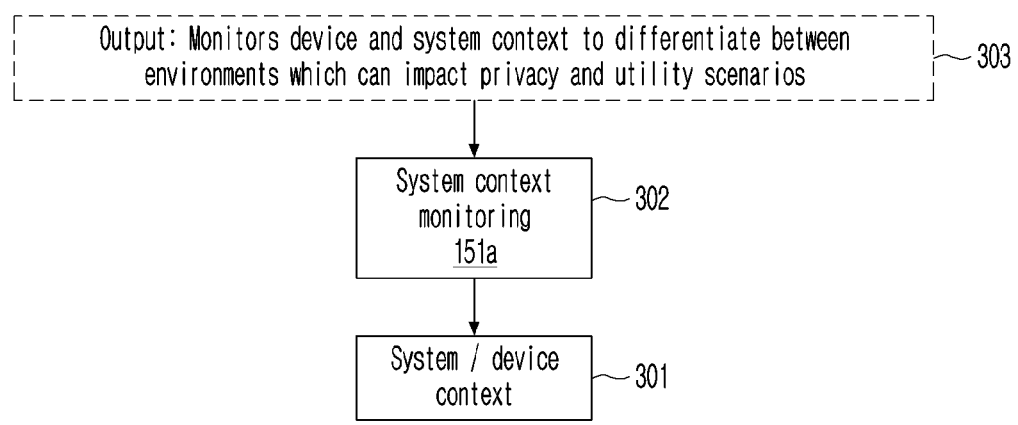
FIGS. 3A, 3B, 3C, 3D, 3E, 3F, 3G, 3H, 3I, 3J, and 3K illustrate various functionality of a privacy and utility controller, according to various embodiments of the disclosure.

Referring to FIG. 3A, At 301-302, the system context monitoring (151*a*) collects information such as the device context/system context of the electronic device (100), for example, as illustrated in Table 1. At 303, the system context monitoring (151*a*) monitors/determines device and system context to differentiate between environments which can impact privacy and utility scenarios based on the collected information.

TABLE 1

| | |
|---|---|
| Device type | Smartphone, Tablet, TV, Smart-watch, Desktop, etc. |
| Screen factor | Large, medium, small, foldable, etc. |
| Device operating mode | Personal, secret, work, kid, elderly, etc. |

Figure 3B:
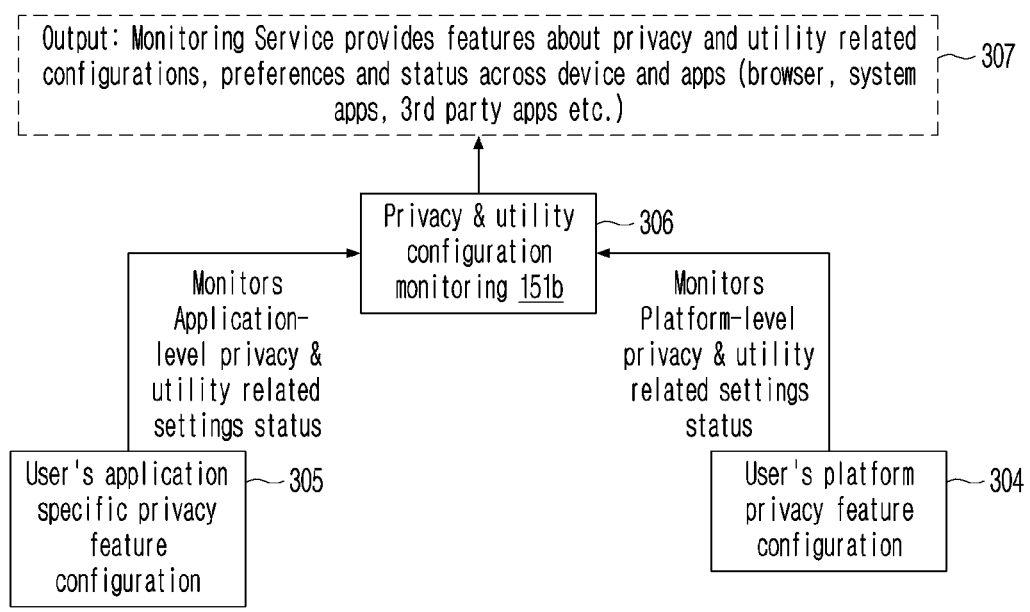

Referring to FIG. 3B, at 304 to 306, the privacy and utility configuration monitoring (151*b*) collects information such as the status of platform-level privacy preference and the status of platform-level utility preference, for example, as illustrated in Table 2.

TABLE 2

| | |
|---|---|
| VPN/Knox Protection usage | Yes/No |
| Secret Folder/Private Mode App Usage | 0-N |
| Personalization Service enabled | Yes/No |
| Reset Advertising ID | 0-N (how many times) |
| Opt-out of Ad personalization | Yes/No |
| Opt-out to receive marketing info | Yes/No |
| App permissions status (Location, Storage, Mic, Camera, . . .) | 0-1 (Normalized, = k/n, k permissions granted out of total n) |

At 305-306, the privacy and utility configuration monitoring (151*b*) collect information such as the status of application-level privacy preference and the status of application-level utility preference, for example for browser application, as illustrated in Table 3.

TABLE 3

| | |
|---|---|
| Secret/Private mode usage | Percentage of 'sites visited'/'browsing time spent in private mode |
| #(Anti-Tracking features) enabled | 0-N |
| # Other Privacy-Security feature usage | 0-N |
| Privacy related extensions | 0-N |
| Ad-blocking features | 0-N |
| Delete Browsing data | 0-N (how many times) |
| Data collection allowance | Yes/No |
| Account sync | Yes/No |
| Site permissions status (Cookies, sensors, storage, popup, . . .) | 0-1 (Normalized, = k/n, k permissions granted out of total n) |

At 307, the privacy and utility configuration monitoring (151*b*) service provides features about privacy and utility related configurations, preferences, and status across device and apps (browser, system apps, $3^{rd}$ party apps, etc.) based on the collected information.

Figure 3C:
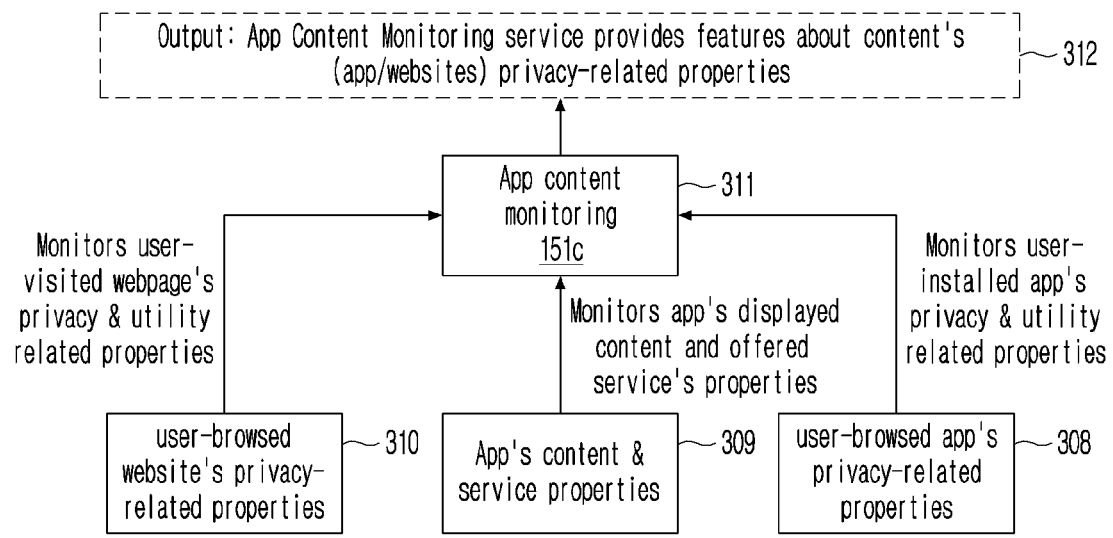

Referring to FIG. 3C, at 308-311 the app content monitoring (151*c*) collects information such as the privacy characteristic and utility characteristics of the user-installed application, for example, as illustrated in Table 4.

TABLE 4

| | |
|---|---|
| No of cross-app trackers present in apps visited | 0-N |
| Cross-app reach of trackers faced by the user | 0-N |
| Instances of PII passed to $3^{rd}$ parties | 0-N |
| Per-app Data acquisition characteristics | {User Name/ID, gender/age details, Bank A/C details, Contact details etc.} |
| Personalization defaults | {Ad-tracking, interest-sharing etc.} |
| Permissions request & access type per app | {Permissions: Location, Storage, Mic, Camera, Contacts; Access Type: denied, allowed, foreground-only, etc.} |

At 309-311, the app content monitoring (151*c*) collects information such as the application characteristic displayed on the screen (140) of the electronic device (100) and the service associated with the application, for example, as illustrated in Table 5.

TABLE 5

| | |
|---|---|
| Topics of screen content | (Adult, Banking, etc.} |
| Topics of search | Adult, Fashion - Formalwear, Alcohol . . . etc.} |
| Topics of recommendation | {Shopping - Formalwear, Shoes etc.} |
| Topics of advertisements | {Property, Shopping - Shoes, Plants, etc.} |
| Category & properties of $3^{rd}$ party services accessed by websites/apps | {Analytics, Ads, Comment, Login, Payment . . .} |

At 310-311, the app content monitoring (151*c*) collects information such as the privacy characteristic and utility characteristics of a user-visited application content, for example for browser application, as illustrated in Table 6.

TABLE 6

| | |
|---|---|
| Type & Count of cross-site trackers and tracking requests in sites | {Type: Storage/fingerprinting/. . . , Count: 0-N} |
| Site-reach of $3^{rd}$ party trackers | 0-N |
| Instances of PII passing through $3^{rd}$ party requests | 0-N |
| PII leakage characteristics | {Name, Login ids, social profile, email id, bank a/c, other unique ids etc.) |
| Browsing information (history, interaction, interests) leakage characteristics to $3^{rd}$ party | {Search keywords, $1^{st}$ party domain/URLs, click interests, other interaction-based information, etc.} |
| Sensor data access request and access per website | {Location, Camera, Mic, Motion, Battery status, etc.} |
| Privacy-setting specific breakage types in the sites | {Main-site main-function (e.g., main content viewing), Main-site sub-function, $3^{rd}$ party main-function (e.g., login), $3^{rd}$ party sub-function (e.g., like button) etc.} |

At 312, the app content monitoring (151*c*) service provides features about content's (app/websites) privacy-related properties based on the collected information.

Figure 3D:
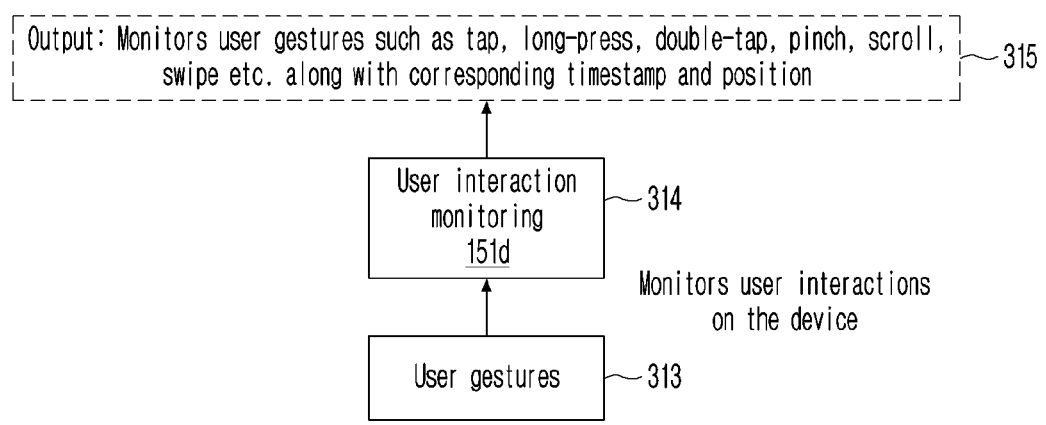

Referring to FIG. 3D, at 313-314 the user interaction monitoring (151*d*) collects information such as the user interaction on the electronic device (100), for example, as illustrated in Table 7.

TABLE 7

| | |
|---|---|
| On-screen gestures | Tap, Double-tap, Pinch, Scroll, Swipe, etc. |
| Off-screen interactions | H/W button press, Fold, Slide, etc. |
| Interaction event timestamps | T ms since boot up |
| Interaction duration | K ms |
| Interaction position | X, y co-ordinates |

At 315, the user interaction monitoring (151*d*) monitors/ determines the user gestures such as tap, long-press, double-tap, pinch, scroll, swipe, etc. along with corresponding timestamp and position based on the collected information.

Figure 3E:
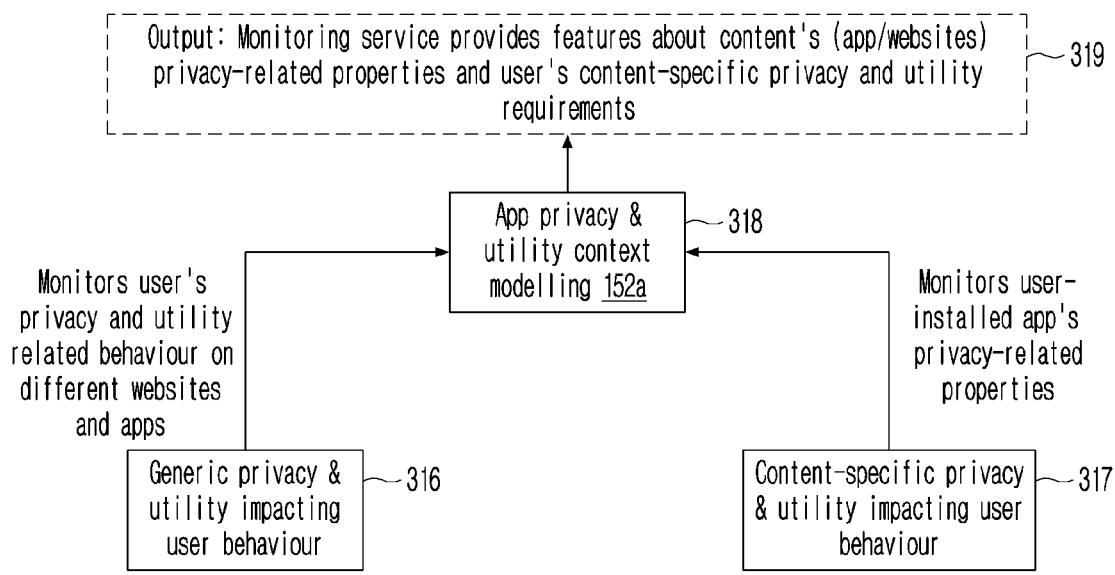

Referring to FIG. 3E, at 316-318 the app privacy and utility context modelling (152*a*) collect information such as the user's privacy and utility related behaviour on different websites and apps, for example, as illustrated in Table 8.

TABLE 8

| | |
|---|---|
| User clicks on generic advertisements/recommendations | 0-N |
| User clicks on interest-based advertisements/recommendations | 0-1 (Percentage of all ad-clicks) |
| Interaction with $3^{rd}$ party social plugins (e.g., like/share/comment etc.) | 0-N |
| $3^{rd}$ party service consumption with shared ids (e.g., video/subscription etc. with common logins) | 0-N |
| User frequency of self-logouts from sites | 0-1 (Percentage of self-logouts/logins) |
| User interaction with marketing or promotional campaigns | {skip, engaged, follow-up action} |
| User time spent on privacy related articles | 0-N |
| User interaction with privacy feature promotions or dashboard | {skip, engaged, follow-up action} |
| Privacy & Security related Apps usage (Firewall, Tracker block, Ad-block) | 0-N |
| User interaction to functionality errors triggered by privacy restriction (Error popup leads to page reload/disable privacy/reattempt) | {correct fix, wrong fix, no attempt, repeat, try-different-app} |

At 317-318, the app privacy and utility context modelling (152*a*) collect information such as the user-installed app's privacy-related properties, for example, as illustrated in Table 9.

TABLE 9

| | |
|---|---|
| Topics of content visited by the user in secret/private mode | {Adult, Banking, etc.} |
| Topics of App visited by the user in secret folder/private mode/VPN | {Adult, Banking, Alcohol, etc.} |
| Type of content user obfuscates/leaves empty before sharing to others (online/offline) | {A/C details, contact details, DOB/age, gender, other Id/details etc.} |
| Topics of recommendation/advertisements user interact with | {Property, Shopping - Shoes, Plants, etc.} |
| Category & properties of $3^{rd}$ party services accessed by websites/apps | {Analytics, Ads, Comment, Payment . . .} |

TABLE 9-continued

| | |
|---|---|
| Sites/apps where user uses logged-in services for $1^{st}$ party content | {Logged-in: shopping app, Anonymous: CNN; . . .} |
| User per-website/per-app interaction with cookie/storage/tracking/personalization permission prompts | {Allow, deny, allow once, deny always . . .} |
| User permission allowance/denial status for each website/app | {Site/App: shopping app, access: location; . . .} |
| User reaction to site/app-specific privacy related functional issues (e.g., Error prompt - partial service, login fail, video load fail, page load fail) | {skip-and-continue, retry, refresh, re-launch, change privacy settings, switch-apps} |

At 319 the app privacy and utility context modelling (152*a*) provides features about content's (app/websites) privacy-related properties and user's content-specific privacy and utility requirements based on the collected information.

Figure 3F:
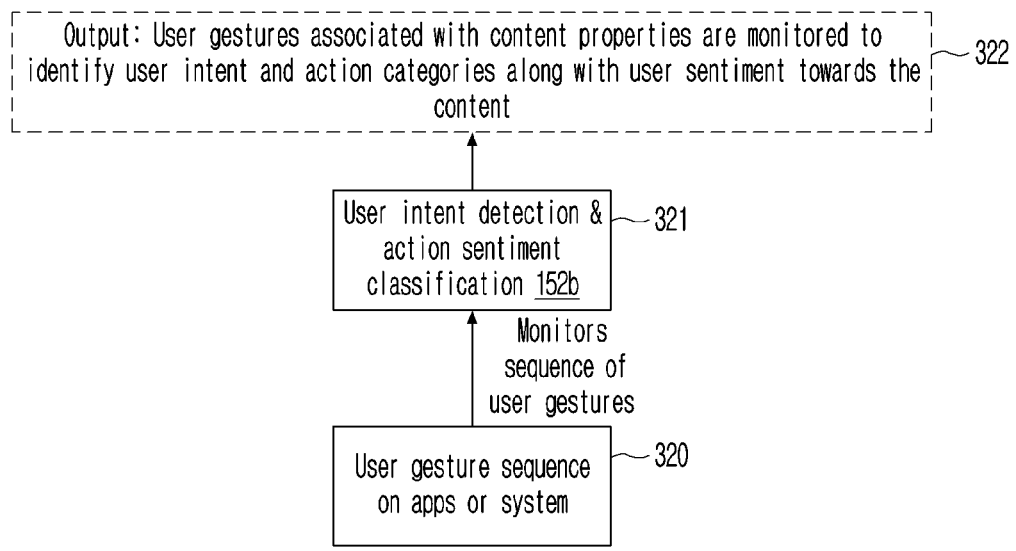

Referring to FIG. 3F, at 320-321, the user intent detection and action sentiment classification (152*b*) collects information such as a sequence of user gestures, for example, as illustrated in Table 10.

TABLE 10

| | |
|---|---|
| User intent identification from a sequence of interaction events | {'Search', 'View', 'Enlarge', 'Comment', 'Minimize', 'Close', 'Hide', 'Show', 'Skip', Allow', 'Deny' etc.} |
| User's reactionary events identification from user interaction sequence | {Skip-and-continue, retry, refresh, re-launch, change privacy settings, switch-apps etc.} |
| User action sentiments | {Positive, Negative, Neutral etc.} |

At 322, the user intent detection and action sentiment classification (152*b*) monitors/determines the user gestures associated with content properties to identify user intent and action categories along with user sentiment towards the content based on the collected information.

Figure 3G:
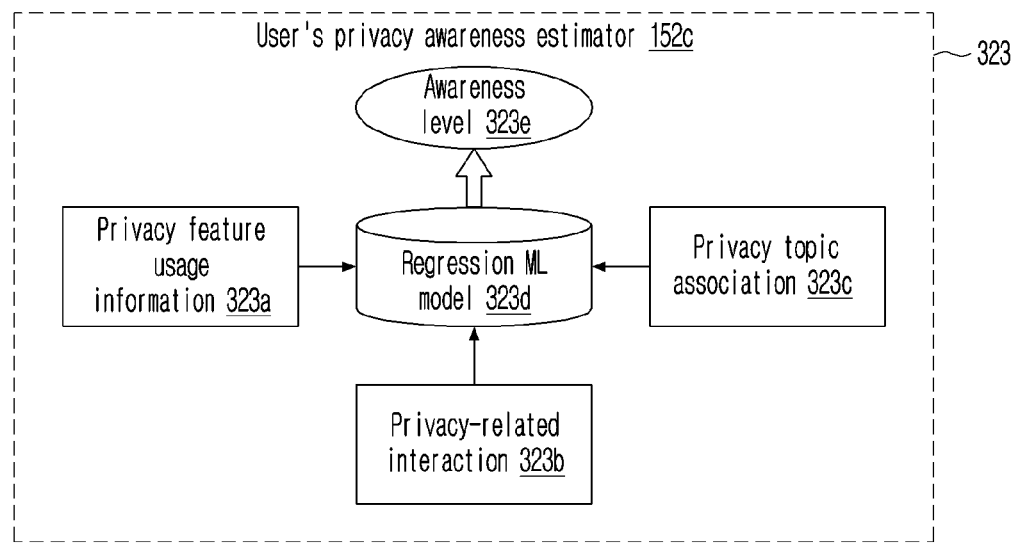

Referring to FIG. 3G, at 323, the user's privacy awareness estimator (152*c*) collects information such as browser or platform-level app privacy features usage status (323*a*), user interactions over privacy feature UI/dashboard, promotion or content {skipped, engaged, follow-up, etc.} (323*b*), and time spent on online privacy-focused informative content (323*c*). The user's privacy awareness estimator (152*c*) then determines a privacy awareness level (323*e*) (Privacy Awareness Level ∈ [0,100], 0 (Lowest) and 100 (Highest)) by applying a regression Machine Learning (ML) model (323*d*) to the collected information.

Figure 3H:
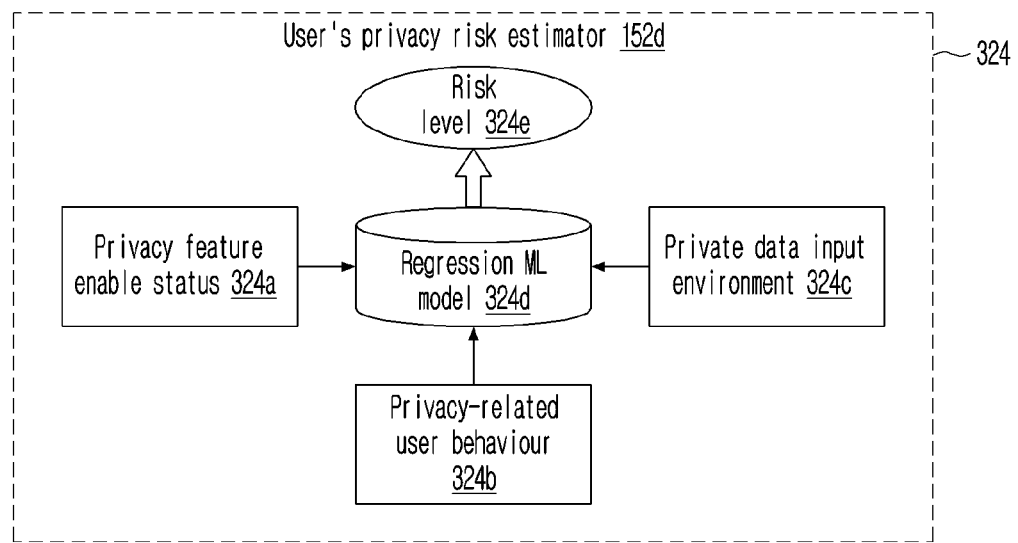

Referring to FIG. 3H, at 324, the user's privacy risk estimator (152*d*) collects information such as browser or platform-level app privacy features enable status (324*a*), user input data type (personal info) (324*c*), privacy related properties of user visited apps/sites (high/mid tracking), and user interactions with $3^{rd}$ party services (like, comment, share, login, ads user logouts, etc.) (324*b*). The user's privacy risk estimator (152*d*) then determines a privacy risk level (324*e*) (Privacy Risk Level ∈ [0,100], 0 (Lowest) and 100 (Highest)) by applying the regression ML model (324*d*) to the collected information. The privacy risk level (324*e*) can also be measured with a multi-class classification model where each class represents different levels of risk. For example, an alternate way of measurement can be done by the below equation, $$p = \alpha * R_{content} + (1-\alpha) * R_{browsing} \qquad \text{Equation 1}$$

Where $R_{content}$ (0-1 range: 0->least risk), $R_{browsing}$ (0-1 range: 0 is a least risk), and $\alpha$=weight of risk profile of content visited by user, usually higher than risk posed by privacy-ignorant browsing behaviour (>0.8). Risk profile score (p) is in [0, 1] range, where 1 is a highest risk. Here, the method defines thresholds (k1, k2) such as 0<k1<k2<1 where [0-k1], [k1, k2] and [k2,1] range specifies {low, mid, high} privacy risk.

Privacy risk posed by contents visited or interacted with by user (Invisible privacy data leakage), for example, as illustrated in Table 11, is given by the below equation, $$R_{content} = \Sigma W_i * \hat{r}_i / \Sigma W_i, \qquad \text{Equation 2}$$

TABLE 11

| Feature | Scoring |
|---|---|
| No of tracker domain presence in websites visited (or apps used) by user | 0-K Scale: 0 implies least risk, higher the K → higher the risk |
| No of tracking requests were sent out from the device to external network while the user browsing | 0-K Scale: 0 implies least risk, higher the K → higher the risk |
| Cross-site domain presence of tracker's found during user browsing | 1-K Scale: 1 implies low risk, higher the K → higher the risk |
| Instances of personal identifiers (e.g., login ids, social ids, search keywords, account info, password, etc.) sent as part of 3$^{rd}$ party requests | 0-K Scale: 0 implies least risk, higher the K → higher the risk (Password leakage top risk, sensitive keywords leakage with account info) |
| User's cross-site browsing history data leakage instance count | 0-K Scale: 0 implies least risk, higher the K → higher the risk |
| User's app-usage and interaction history leakage instance count | 0-K Scale: 0 implies least risk, higher the K → higher the risk |
| Data leakage estimation based on automatic understanding from privacy policies | 0-K Scale: 0 implies least data leakage, higher the K → higher data leakage risk |
| Instance count of phishing or unsafe site visit* | 0-K Scale: 0 implies least risk, higher the K → higher the risk |

Features related to user's browsing behaviour across browser/apps, for example, as illustrated in Table 12, are given below equation, $$R_{browsing} = 1 - ((\Sigma w_i * x_i) / \Sigma W_i) \qquad \text{Equation 3}$$

TABLE 12

| Feature | Scoring |
|---|---|
| How often do user clicks on personalized ads? | 0-1 Scale: 1 implies no click, more clicks → score tends to be 0 |
| How often user follows personalized content recommendations? | 0-1 Scale: 1 implies does not follow, the more user follows → score tends to be 0 |
| Does the user frequently logs out of a site or keeps logged in? | 0-1 Scale: 0 implies no self-logout, more user initiated logouts → score tends to be 1 |

TABLE 12-continued

| Feature | Scoring |
|---|---|
| The user interacts with social plugins (e.g., Like, Share, Comment, etc.) | 0-1 Scale, No interaction: score = 1, more interaction, score tends to 0 |
| The user uses commenting platform which requires logins (FB, discuss, etc.)? | 1/0 Boolean: No use implies score = 1, else 0 |
| Does the user use existing social login (e.g., FB, Google, etc.) for commenting? | 1/0 Boolean: No use implies score = 1, else 0 |
| User response to sensor permission prompts (e.g., location) in browser? (allow/deny) | 0-1 Scale: The more allow permission, the score tends to 0, all denied: score 1 |

Figure 3I:
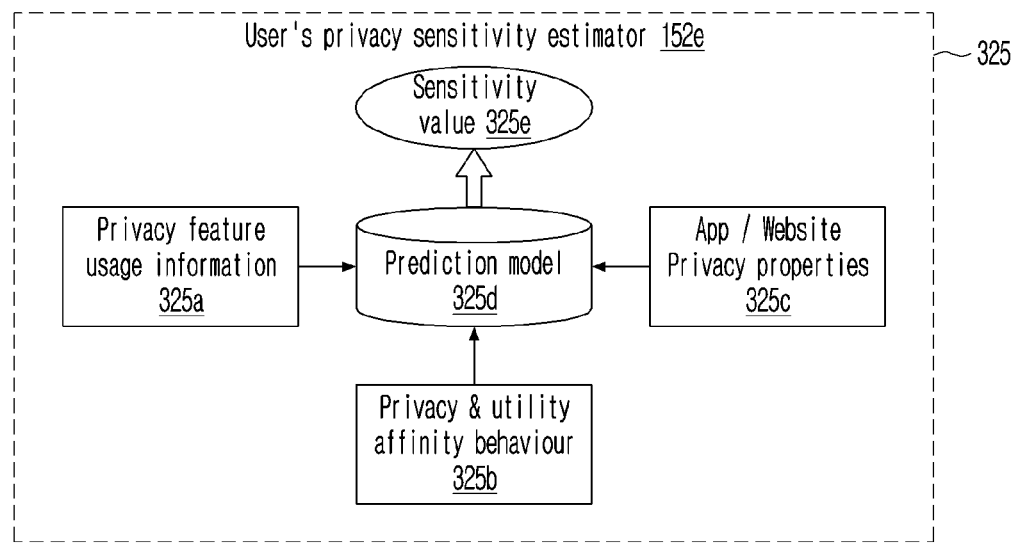

Referring to FIG. 3I, at 325, the user's privacy sensitivity estimator (152e) collects information such as browser or platform-level app privacy features change status from the default (e.g., enabled default off privacy feature (325a), opt-out of personalization, reset advertising id, etc.), user sentiment analysis over interactions over content (clicks on ads/recommendation, like/share/comment, permission grants for services, reaction to privacy related error prompts, etc.) (325b), and content's privacy properties (data collection practices, data sharing about users to 3$^{rd}$ parties, etc.) (325c). The user's privacy sensitivity estimator (152e) then determines a privacy sensitivity level (325e) (Privacy Sensitivity Level ∈ [0,1], 0 (Lowest) and 1 (Highest)) or a privacy sensitivity class (Privacy Sensitivity Class ∈ [Low, . . . , High], Low (Lowest) andHigh (Highest)) by applying the prediction model (325d) to the collected information.

Figure 3J:
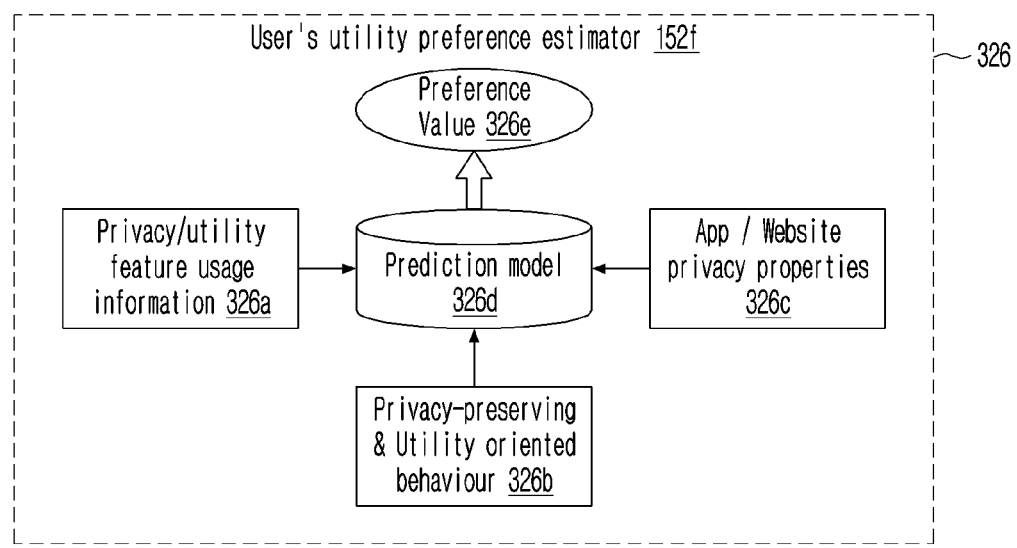

Referring to FIG. 3J, at 326, the user's utility preference estimator (152f) collects information such as browser or platform-level app privacy and utility features change status from the default (e.g., disable privacy setting (326a), opt-in for data collection, personalization, etc.), user sentiment analysis over interactions over content (clicks on ads/recommendation, frequent logouts, permission grant/denials, reaction to site popups, etc.) (326b), and content's utility properties (high/low privacy-compromising content usage, etc.) (326c) then determines a utility preference level (326e) (utility preference Level ∈ [0,1], 0 (Lowest) and 1 (Highest)) and a utility preference class (utility preference Class [Low, . . . , High], Low (Lowest) andHigh (Highest)) by applying the prediction model (326d) to the collected information.

Figure 3K:
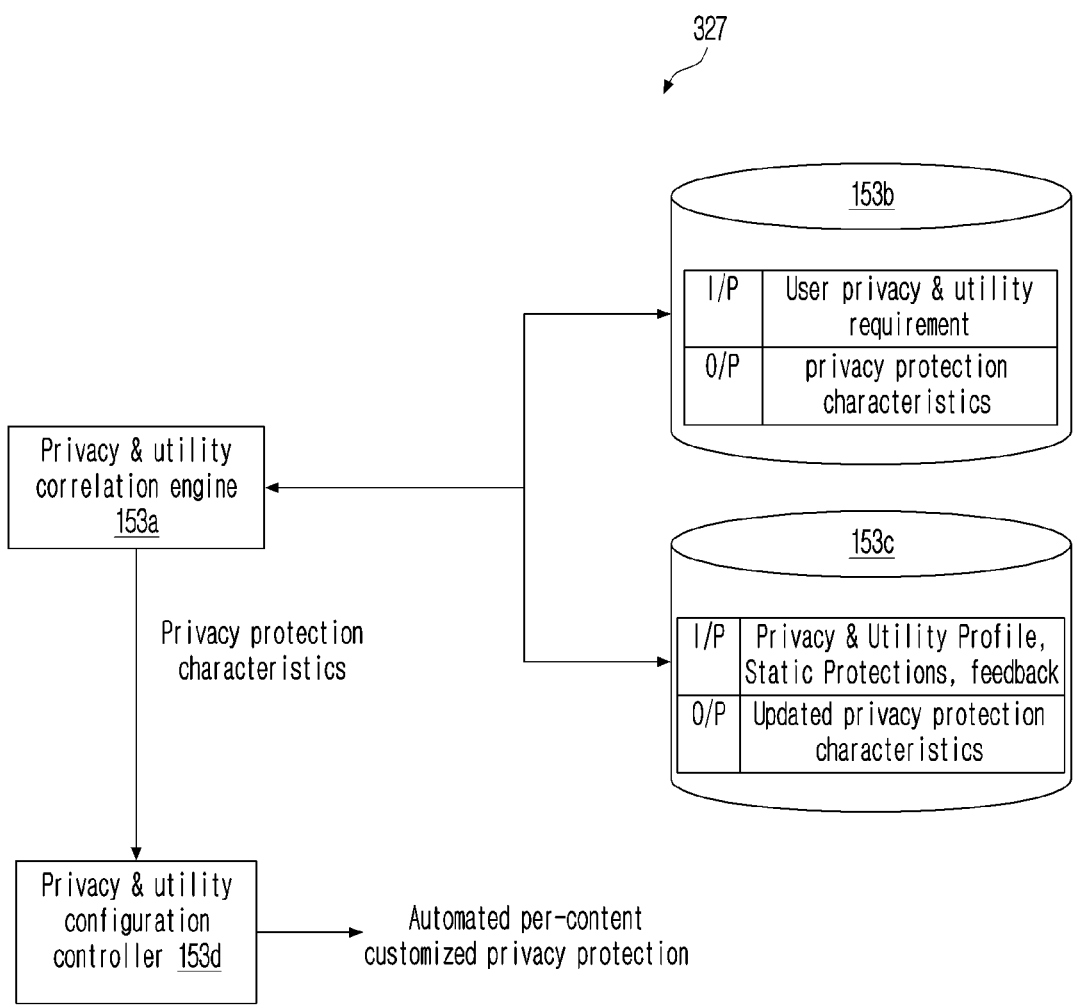

Referring to FIG. 3K, at 327, the mapping engine (153b) identifies privacy requirement(s) based on a set of privacy protection configuration changes, given context parameters, and a set of privacy risk factors provided for specific content, for example, as illustrated in Tables 13 and 14.

TABLE 13

Privacy risk factor 1 - probable data leakage items: {URL, interactions, Email-id, etc.}
Privacy risk factor 2 - 3$^{rd}$ party tracker type: {State-full trackers - cookie-based}
. . .
Privacy risk factor N - 1$^{st}$ party logged-in profile association: {Yes}

TABLE 14

| | |
|---|---|
| Privacy protection enable requirement 1 | $3^{rd}$ party tracking protection + referrer URL filtering + ID-protection |
| Privacy protection enable requirement 2 | Storage protection - Cookies |
| ... | ... |
| Privacy protection enable requirement n | Sandboxed storage-partitioned access (to access 1st party site in logged-out state avoiding profile linking) |
| Content-specific privacy need | High (as content matched to one of privacy-sensitive categories) |

The mapping engine (153b) identifies utility requirement(s) based on a set of privacy protection configuration changes that need to be turned off, given context parameters, and a set of utility factors provided for the specific content, for example, as illustrated in Tables 15 and 16.

TABLE 15

| |
|---|
| Utility factor 1 - $1^{st}$ party login required: {No} |
| Utility factor 2 - $3^{rd}$ party login required: {No} |
| ... |
| Utility factor N - Commenting service used: {No} |
| Context information - {Content type: Intimate wear, User type: Utility-sensitive to $1^{st}$-party logins etc.} |

TABLE 16

| | |
|---|---|
| Privacy protection disable requirement 1 | Disable clearing $1^{st}$ party storage {No} |
| Privacy protection disable requirement 2 | Disable clearing $3^{rd}$ party storage {No} |
| ... | ... |
| Privacy protection disable requirement N | Disable $3^{rd}$ party cookie blocking for commenting service provider {No} |
| Content-specific utility need | Low (as utility factor requirement does not match to utility-sensitiveness, i.e., $1^{st}$ party logins) |

The privacy and utility correlation engine (153a) fetches values of the privacy protection characteristic from the mapping engine (153b)/privacy characteristics prediction store (153c) based on the user's privacy & utility requirement according to the sensitivity profile. The privacy & utility configuration controller (153d) invokes privacy protection configuration characteristics value on a system and application content. This may also exhibit in form of user recommendations of privacy settings temporarily or in a persistent manner. The final configurations can be accessed by the user to view and modify. The configurations are applied by the app data & network request-response filtering (153e), which may apply certain data filtering techniques such as block or allow network requests, app profile sandboxing, block or clearing app or site storage, data obfuscation, etc.

FIG. 4 is a flow diagram illustrating a method for determining a privacy sensitivity level and a privacy sensitivity class, according to an embodiment as disclosed herein.

Referring to FIG. 4, operations 401 to 405 performs by the user's privacy sensitivity estimator (152e) to determine the privacy sensitivity level and the privacy sensitivity class.

At operation 401, the user's privacy sensitivity estimator (152e) assigns weights ($w_i$) to individual privacy related properties ($x_i$) based on various parameters (e.g., system privacy feature usage, browser privacy feature usage, privacy-preserving app/browser usage behaviour, and visited app/site privacy properties). The weights ($w_i$) are pre-decided based on feature importance as, $w_i$ (more complex and high-protection privacy features)>$w_j$ (easy to access features and less-protective privacy features), as per the heuristic-based mechanism. Furthermore, the weights (wi) are learned from data and a pre-trained model with feature weights is deployed for inference on-device, as a supervised learning mechanism. At operation 402, the user's privacy sensitivity estimator (152e) calculates scores of various privacy-related feature points ($x_i$). At operation 403, the user's privacy sensitivity estimator (152e) normalizes individual features to [0-1] (a higher score indicates more privacy-sensitive). At operation 404, the user's privacy sensitivity estimator (152e) calculates overall privacy sensitivity probability (p)=$\Sigma w_i * x_i / \Sigma w_i$. At operation 405, the user's privacy sensitivity estimator (152e) identifies threshold values (Ki) to determine the privacy sensitivity level and the privacy sensitivity class. The privacy sensitivity level/score remains in the [0, 1] range, where a higher score indicates higher sensitivity. The privacy sensitivity class segregation, k1, and k2 values are parameters of the heuristic. Which can be determined based on experiments on a small sample dataset or can be learned through a supervised learning algorithm. One such example of default values are {k1:0.2, and k2:0.5}.

Figure 5:
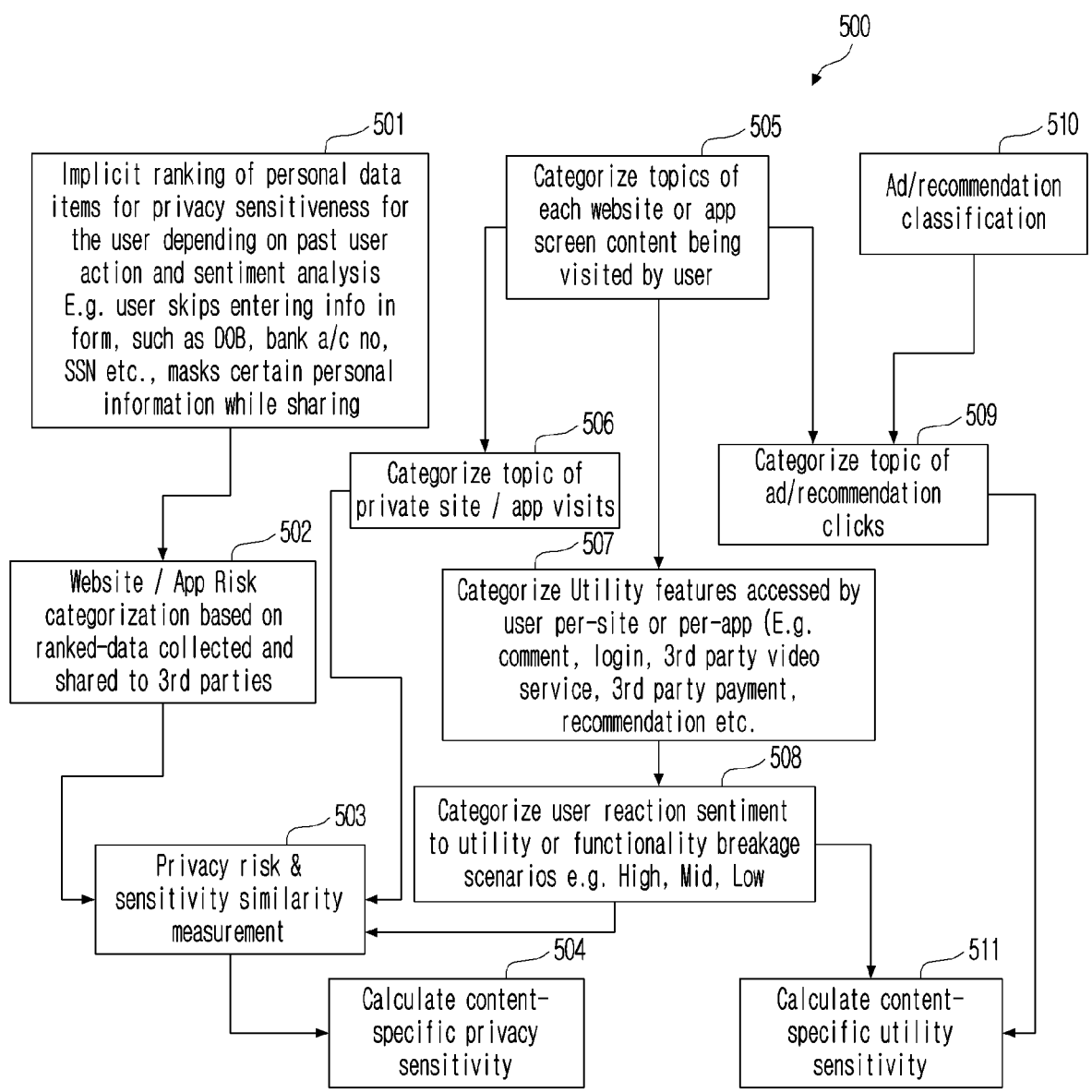
FIG. 5 is a flow diagram illustrating a method for determining a content specific privacy profile and a content specific utility preference, according to an embodiment of the disclosure.

FIG. 5 is a flow diagram illustrating a method for determining the content specific privacy profile and the content specific utility preference, according to an embodiment as disclosed herein.

Based on privacy risk and sensitivity similarity measurement (503) of flow diagram 500, the content-specific privacy sensitivity estimator (152g) determines the user's content-specific privacy profile (504). The privacy risk and sensitivity similarity measurement (503) are based on risk categorization of a website/app (502), a category or topic of a private site/app accessed by the user (506), and various categories of a user's reaction sentiment (508), such as High, Mid, and Low to utility or functionality breakage scenarios. The risk classification of a website/app is based on ranked data collected and shared with third parties (502), where data is ranked (501) based on past user action and sentiment analysis (e.g., user skips entering information in a form, such as DOB, bank account number, SSN, etc., masks certain personal information while sharing).

The content-specific utility sensitivity estimator (152h) determines the content-specific utility preference (511) based on various categories of a user's reaction sentiment (508), such as High, Mid, and Low, to utility or functionality breakage scenarios, as well as various categories of ad/recommendation clicks. Where the user reaction sentiment to utility is defined by utility features accessed by the user per site or per app (e.g., comment, log in, third-party video service, third-party payment, recommendation, and so on) and topics of each website or app visited by the user (507), category or topic of advertisement/recommendation clicks (509), where the category or topic of advertisement/recommendation clicks (509) is determined based on a category or topic of each website/application screen content visited by the user (505) and a classification of advertisement/recommendation (510).

Figure 6:
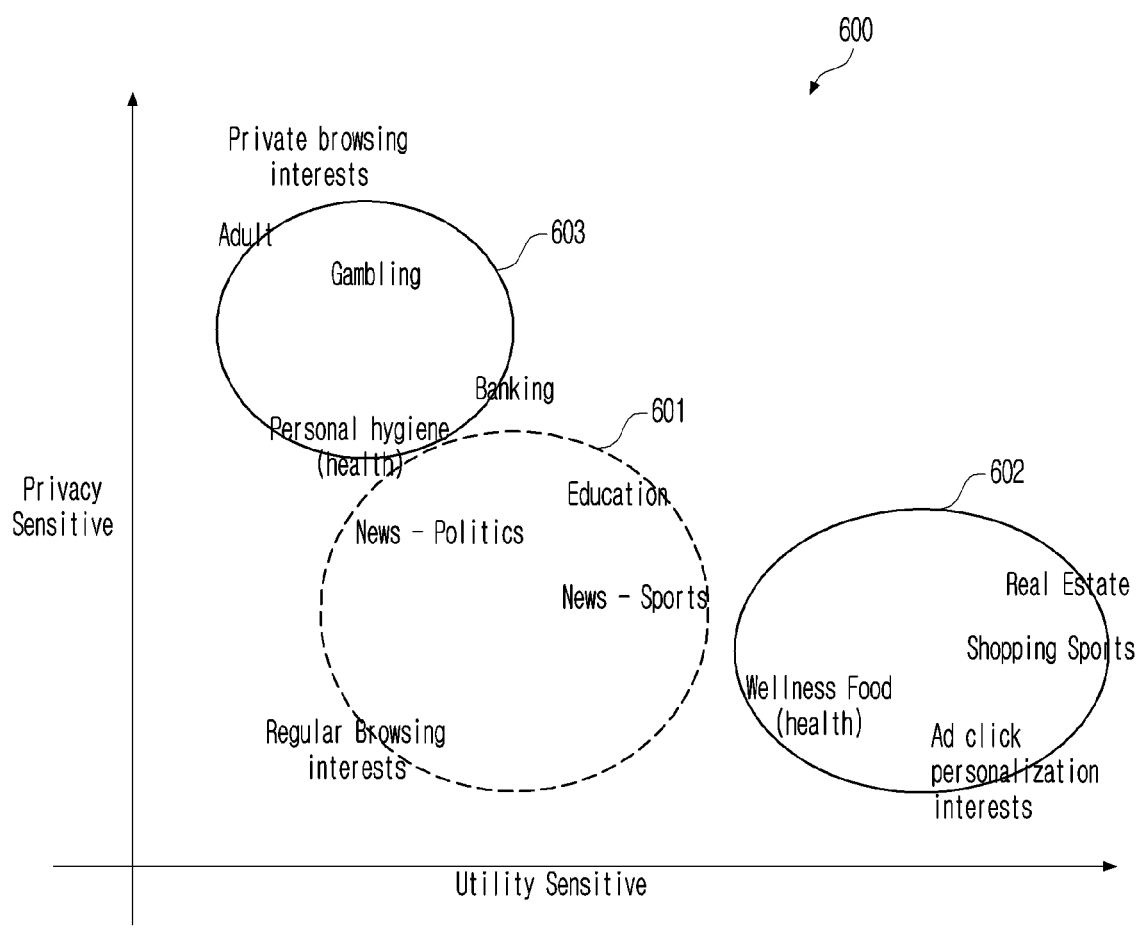
FIG. 6 illustrates an approach of detecting user's content-specific privacy and utility sensitivity for new content, according to an embodiment of the disclosure.

FIG. 6 illustrates an approach of detecting user's content-specific privacy and utility sensitivity for new content, according to an embodiment of the disclosure.

Referring to FIG. 6, the content-specific privacy sensitivity estimator (152g) and the content-specific utility sensitivity estimator (152h) are in charge of predicting a user's privacy sensitiveness and utility preference toward any given content by applying methods such as unsupervised latent-topic and semantic similarity-based clustering. To anticipate the same based on user browsing behaviour, the unsupervised latent-topic and semantic similarity-based clustering approach is described. For example, consider the following procedure for visiting websites through a web browser. The same may be said for the app level.

Any website visit is categorized into one of the three different groups:

Normal-mode general browsing (A) (601): the websites visited by the user in a normal mode as first-party click navigation or direct navigation. This is a main-target group for which privacy and utility sensitiveness need to be predicted.

Utility-driven browsing (B) (602): the website visits and interaction resulting from user clicks on third-party embeds (e.g., ads, recommendations, etc.) or search results. This is a sub-target group for prediction.

Private browsing (C) (603): the websites visited by the user on an incognito or secret mode or previously chosen/recommended privacy protected mode.

Finally, content's semantic embedding is calculated for each website and it is used to predict privacy and utility sensitiveness for similar content as mentioned below equations.

$$S(K) = \beta * C(K) + (1 - \beta) * C(K') - B(K) + \delta \quad \text{Equation 4}$$

$$C(K) = \frac{\Sigma_{i \in K} w_i}{L}, \; C(K') = \frac{\Sigma_{j \notin K} w_j}{M}, \; B(K) = \frac{\Sigma_{k \in K} w_k}{N} \quad \text{Equation 5}$$

Here in equation (4), a measure of similarity, S (K) is calculated for the website, belonging to latent topic-class K. If S (K)>0, this website is predicted to have similar privacy and utility sensitiveness as that of other same-class (K) sites from group C, as it is more likely to have similar properties of same-class sites visited in secret/private browsing. Otherwise, it is predicted to have similar sensitivity as that of same-class (class K) from group B. $\beta$ and $\delta$ are estimated with empirical experiments. Topic-class K can be extended to another kind of categorization of websites (data leakage-sensitivity class, utility-class, reaction-severity class, etc.) In Equation 5, $w_i$ measure the semantic similarity of i-th website with the current website being considered. Also below similarity measures are calculated:

C(K)=Average similarity measure from the group of past visited websites from the same class K in private browsing (group C), C(K')=Average similarity measure from the group of past visited websites from other classes K' in private browsing (group C), B (K)=Average similarity measure from the group of past visited websites from the same class K in utility-driven browsing (group B).

Figure 7A:
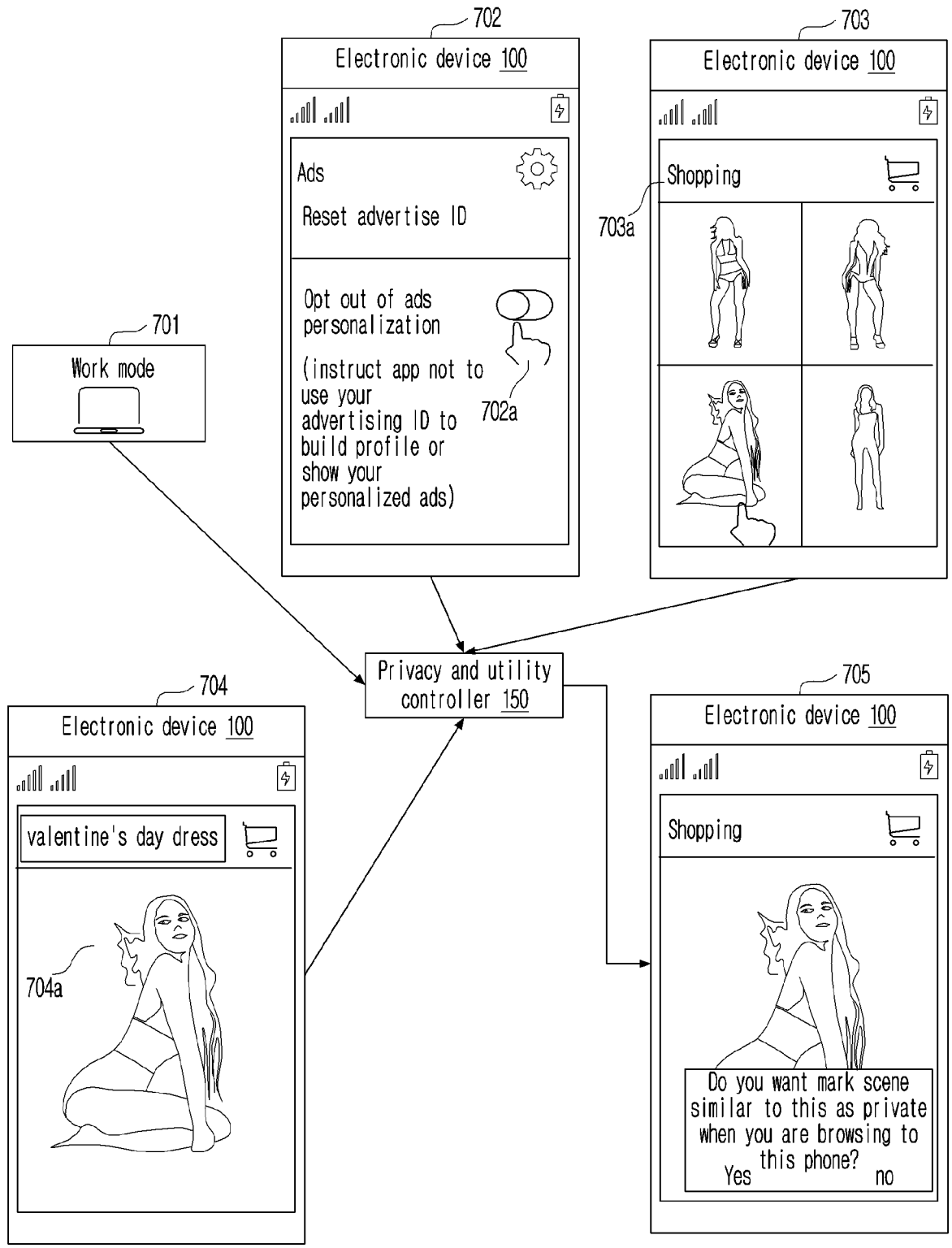
FIGS. 7A and 7B are example scenarios illustrating an enhanced privacy protection for sensitive content within one application based on previous user interactions learning with multiple applications, according to various embodiments of the disclosure.
Figure 7B:
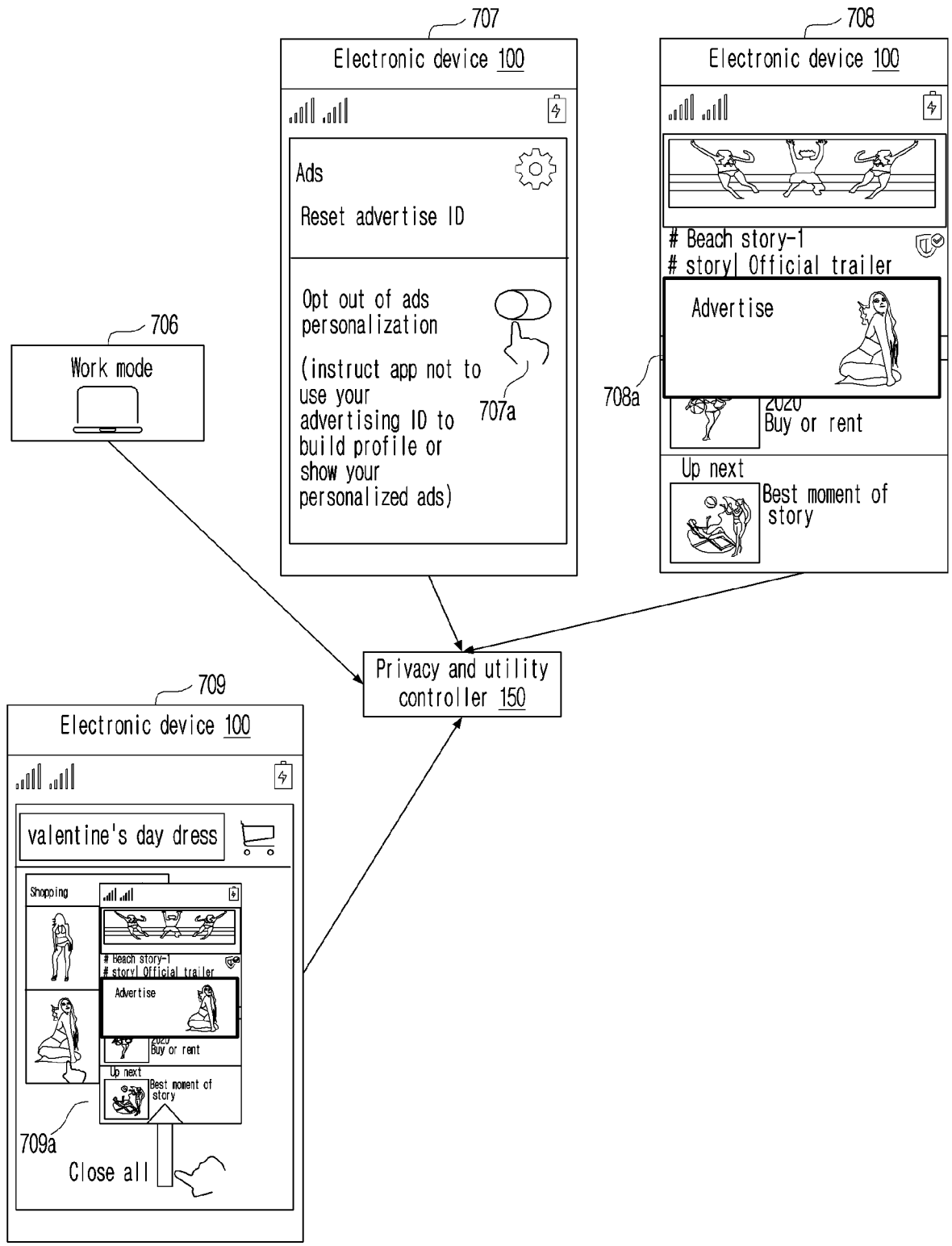

FIGS. 7A and 7B are example scenarios illustrating an enhanced privacy protection for sensitive content within one application based on previous user interactions learning with multiple applications, according to various embodiments of the disclosure.

Referring to FIG. 7A, Consider a scenario in which the user of the electronic device (100) opens an e-commerce application in the work mode and looks for gifts (e.g., Valentine's Day dress), and the search results reveal intimate clothing. Because of previous on-device personalized learning, the privacy and utility controller (150) determines that 'intimate wear' content is privacy-sensitive for the user in the work mode. The privacy and utility controller (150) recognizes increased privacy protection characteristics and applies them to the currently running e-commerce application, blocking third-party trackers and creating profile isolation to delink sensitive interactions from the user's logged-in profile. A step-by-step procedure (701-705) for the enhanced privacy protection for sensitive content within one application based on previous user interactions learning with multiple applications is described below.

At 701, the system context monitoring (151a) determines the device context, for example, as illustrated in Table 17.

TABLE 17

| Screen size | Medium |
|---|---|
| Device operating mode | Work |

At 702, the privacy and utility configuration monitoring (151b) determine the privacy configuration and the utility configuration (702a), for example, as illustrated in Table 18.

TABLE 18

| Privacy & Utility configuration state | |
|---|---|
| Privacy protection | Low |
| Personalization | ON |
| Advertising ID | Unique, shared |

At 703, the app content monitoring (151c) determines the currently running application context (703a), for example, as illustrated in Table 19.

TABLE 19

| App content state | |
|---|---|
| App name | shopping app |
| Content-type | Product view (Image) |
| App screen | Product page |

At 704, the user interaction monitoring (151d) determines the user interaction across the application and is used to identify the user intent and the action categories along with user sentiment towards the displayed content on the screen (140) of the electronic device (100), for example, as illustrated in Table 20.

TABLE 20

| User interaction information | |
|---|---|
| Interaction trigger | User selection |
| Interaction sequence with | User types 'valentine's day dress for wife' (search bar) –> |
| event-screen info | Clicks (search result) |
| User initiated content | Yes |

Furthermore, the app privacy and utility context modelling (152a) (not shown in FIG. 7A) of the privacy and utility controller (150) receives input from the system context monitoring (151a), the privacy and utility configuration monitoring (151b), and the app content monitoring (151c). Furthermore, the app privacy and utility context modelling (152a) provides features about content's (app/websites) privacy-related properties and users' content-specific privacy and utility requirements (704a), for example, as illustrated in Table 21.

TABLE 21

| | |
|---|---|
| Current active app | Shopping |
| Visible Content Topic | Intimate wear |
| App Privacy status | Cross-app trackers: tracker. Example, Support Incognito: NO |
| App Data sharing | Advertising ID, Shopping ID, clicked content URL, viewed product URL |

Furthermore, the privacy and utility controller (150) learns sensitivity labels, for example, as illustrated in Table 22.

TABLE 22

| | |
|---|---|
| User privacy sensitivity | Moderate |
| Privacy sensitive topic/scenario | 'Intimate wear' in 'Work' & 'Dex' mode |
| Utility sensitive topic/scenario | NA |

Furthermore, the user intent detection and action sentiment classification (152b) (not shown in FIG. 7A) of the privacy and utility controller (150) detects the user intent and sentiment, for example, as illustrated in Table 23.

TABLE 23

| User intent & action sentiment | |
|---|---|
| Interaction intent | 'Find' |
| Action | Open search result |
| User action sentiment | Neutral during search |

Furthermore, the privacy and utility correlation engine (153a) (not shown in FIG. 7A) of the privacy and utility controller (150) determines the privacy protection characteristic of the user based on the generated feature, the determined content specific privacy profile, and the determined content specific utility preference of the user and co-relates the privacy protection characteristic with the application using the mapping engine (153b), for example, as illustrated in Table 24.

TABLE 24

| | |
|---|---|
| Anti-Tracking | Block 3$^{rd}$ party trackers in the shopping application |
| Profile isolation | Temporary profile creation from the point of search and viewing sensitive content → detached from main logged in shopping profile |
| Data obfuscation | Anonymization, Ad ID masking |

Then, the privacy and utility correlation engine (153a) stores co-relation in the privacy characteristics prediction store (153c). Then, at 705, the privacy and utility configuration controller (153d) (not shown in FIG. 7A) of the privacy and utility controller (150) generates the one or more personalized settings for future user interaction based on co-relation, and the app data and network request-response filtering (153e) (not shown in FIG. 7A) of the privacy and utility controller (150) automatically personalize the application of the electronic device (100) based on one or more generated personalized settings.

Referring to FIG. 7B, Consider a scenario in which the user of the electronic device (100) opens video application in the work mode, videos related to women's innerwear appeared. To avoid further embarrassment, user immediately closed and re-launched the video application so that video application refresh prevents same video to not appear again. The privacy and utility controller (150) monitors and interprets application context (e.g., innerwear topic) and user interaction context (Negative sentiment action towards the content). The privacy and utility controller (150) learns that viewing 'intimate wear' in 'work mode' as privacy sensitive for this user. A step-by-step procedure (706-709) for the enhanced privacy protection for sensitive content within one application based on previous user interactions learning with multiple applications is described below.

At 706, the system context monitoring (151a) determines the device context, for example, as illustrated in Table 25.

TABLE 25

| | |
|---|---|
| Screen size | Medium |
| Device operating mode | Work |

At 707, the privacy and utility configuration monitoring (151b) determine the privacy configuration and the utility configuration (707a), for example, as illustrated in Table 26.

TABLE 26

| Privacy & Utility configuration state | |
|---|---|
| Privacy protection | Low |
| Personalization | ON |
| Advertising ID | Unique, shared |

At 708, the app content monitoring (151c) determines the currently running application context (708a), for example, as illustrated in Table 27.

TABLE 27

| App content state | |
|---|---|
| App name | Video app |
| Content-type | Main Content (Video) |
| App screen | Homepage |

At operation 709, the user interaction monitoring (151d) determines the user interaction across the application and is used to identify the user intent and the action categories along with user sentiment towards the displayed content on the screen (140) of the electronic device (100), for example, as illustrated in Table 28.

TABLE 28

| User interaction information | |
|---|---|
| Interaction trigger | Video Homepage content update |
| Interaction sequence with event-screen info | Press Home button (Video) -> Recent Tasks (Home Screen) -> Swipe (On Video) -> Tap App icon (Video) |
| User initiated content | No |

Furthermore, the app privacy and utility context modelling (152a) (not shown in FIG. 7B) of the privacy and utility controller (150) receives input from the system context monitoring (151a), the privacy and utility configuration monitoring (151b), and the app content monitoring (151c). Furthermore, the app privacy and utility context modelling (152a) provides features about content's (app/websites) privacy-related properties and users' content-specific privacy and utility requirements (709a), for example, as illustrated in Table 29.

TABLE 29

| | |
|---|---|
| Current active app | Video |
| Visible Content Topic | Innerwear (Lingerie) |
| App Privacy status | Cross-app trackers: doubleclick.net |
| App Data sharing | Advertising ID, search keywords, video title |

Furthermore, the privacy and utility controller (150) learns sensitivity labels, for example, as illustrated in Table 30.

TABLE 30

| | |
|---|---|
| User privacy sensitivity | Moderate |
| Privacy sensitive topic/scenario | 'Intimate wear' in 'Work mode' |
| Utility sensitive topic/scenario | NA |

Furthermore, the user intent detection and action sentiment classification (152b) (not shown in FIG. 7B) of the privacy and utility controller (150) detects the user intent and sentiment, for example, as illustrated in Table 31.

TABLE 31

| User intent & action sentiment | |
|---|---|
| Interaction intent | Hide App screen content |
| Action | App close & relaunch |
| User action sentiment | NEGATIVE towards homepage content |

Furthermore, the privacy and utility correlation engine (153a) (not shown in FIG. 7B) of the privacy and utility controller (150) determines the privacy protection characteristic of the user based on the generated feature, the determined content specific privacy profile, and the determined content specific utility preference of the user and co-relates the privacy protection characteristic with the application using the mapping engine (153b).

Then, the privacy and utility correlation engine (153a) stores co-relation in the privacy characteristics prediction store (153c). Then, the privacy and utility configuration controller (153d) (not shown in FIG. 7B) of the privacy and utility controller (150) generates the one or more personalized settings for future user interaction based on co-relation, and the app data and network request-response filtering (153e) (not shown in FIG. 7B) of the privacy and utility controller (150) automatically personalize the application of the electronic device (100) based on one or more generated personalized settings.

Figure 8:
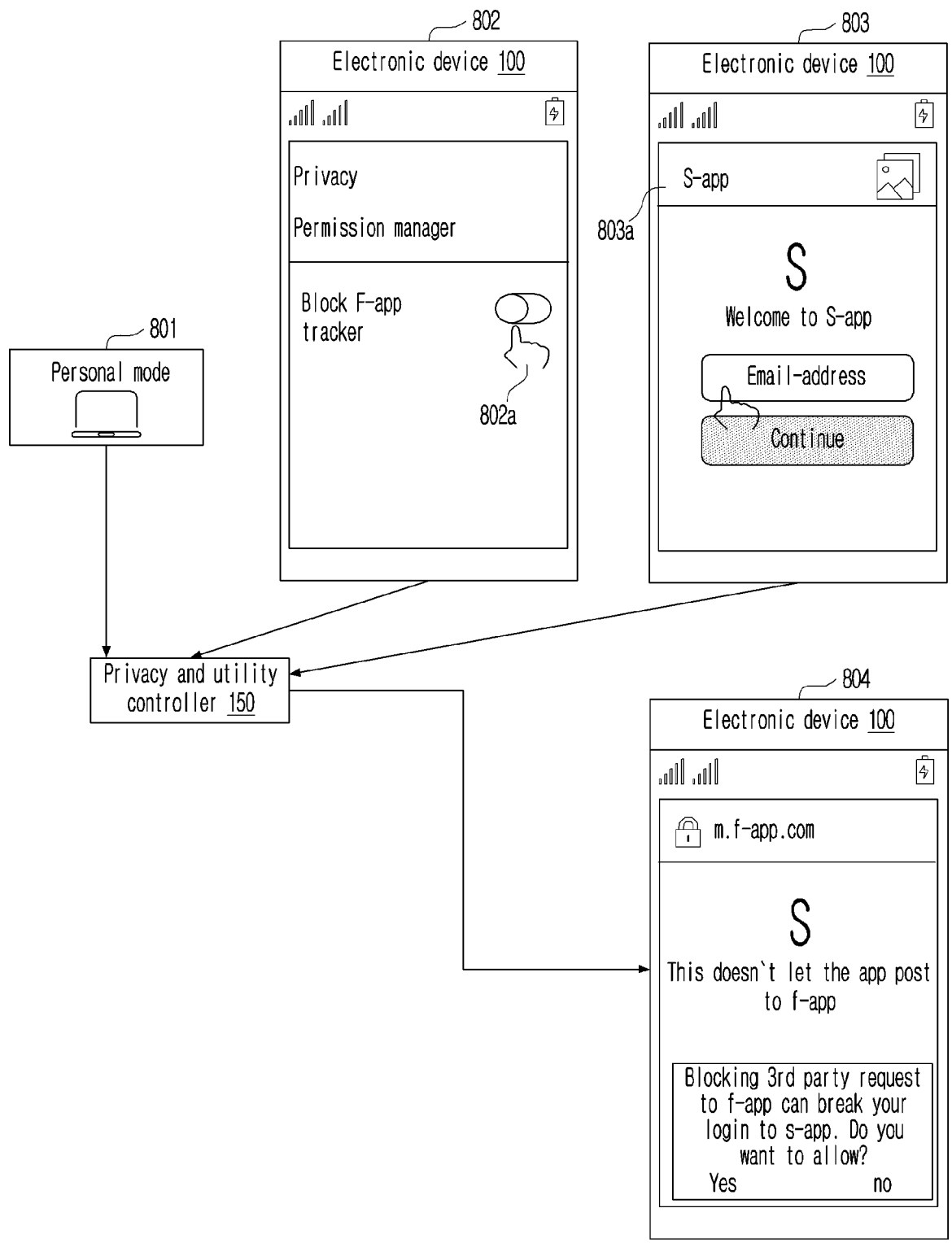
FIG. 8 is an example scenario illustrating a privacy protection exemption to avoid an application login failure based on previous user interactions learning with multiple applications, according to an embodiment of the disclosure.

FIG. 8 is an example scenario illustrating a privacy protection exemption to avoid an application login failure based on previous user interactions learning with multiple applications, according to an embodiment as disclosed herein.

Consider a scenario in which the user of the electronic device (100) tries login to a second social application (i.e., s-app) with a first social application (i.e., f-app). The privacy and utility controller (150) automatically recognizes "login with the first social application" in this app as utility scenario. This time when the user proceeded to first social application login page, the privacy and utility controller (150) applies previous learning and recommends to disable "f-app tacker blocking" only for the second social application to prevent login failure with a permission prompt. The privacy and utility controller (150) applies privacy configurations for the second social application after the user consents, and the user can log in without error. As a result of the application of on-device learning of utility scenario from past interactions, there was no need to visit a privacy settings of the electronic device (100), nor did the first social application tracker have to be enabled for all apps. A step-by-step procedure (801-804) for the privacy protection exemption to avoid application login failure based on previous user interactions learning with multiple applications is described below.

At 801, the system context monitoring (151a) determines the device context, for example, as illustrated in Table 32.

TABLE 32

| | |
|---|---|
| Screen size | Medium |
| Device operating mode | Personal |

At 802, the privacy and utility configuration monitoring (151b) determine the privacy configuration and the utility configuration (802a), for example, as illustrated in Table 33.

TABLE 33

| Privacy & Utility configuration state | |
|---|---|
| Privacy protection | High |
| Personalization | OFF |
| Advertising ID | Block F-app as $3^{rd}$ party |

At 803, the app content monitoring (151c) determines the currently running application context (803a), for example, as illustrated in Table 34.

TABLE 34

| App content state | |
|---|---|
| App name | S-app |
| Content-type | Login option with F-app |
| App screen | Login page |

Furthermore, the user interaction monitoring (151d) (not shown in FIG. 8) of the privacy and utility controller (150) determines the user interaction across the application and is used to identify the user intent and the action categories along with user sentiment towards the displayed content on the screen (140) of the electronic device (100), for example, as illustrated in Table 35.

TABLE 35

| User interaction information | |
|---|---|
| Interaction trigger | S-app login with F-app credentials |
| Interaction sequence with event-screen info | Press 'Login with F-app button (S-app) |
| User initiated content | No |

Furthermore, the app privacy and utility context modelling (152a) (not shown in FIG. 8) of the privacy and utility controller (150) receives input from the system context monitoring (151a), the privacy and utility configuration monitoring (151b), and the app content monitoring (151c).

Furthermore, the app privacy and utility context modelling (152a) determine service provides features about content's (app/websites) privacy-related properties and users' content-specific privacy and utility requirements, for example, as illustrated in Table 36.

TABLE 36

| | |
|---|---|
| Current active app | S-app |
| Visible Content Topic | 3rd party login with F-app |
| App Privacy status | Cross-app trackers: F-app.com |
| App Data sharing | Advertising ID, F-app ID, view and tap history |

Furthermore, the privacy and utility controller (150) learns sensitivity labels, for example, as illustrated in Table 37.

TABLE 37

| | |
|---|---|
| User privacy sensitivity | High |
| Privacy sensitive topic/scenario | 'Intimate wear' in 'work/dex' mode |
| Utility sensitive topic/scenario | 3rd party login with F-app |

Furthermore, the user intent detection and action sentiment classification (152b) (not shown in FIG. 8) of the privacy and utility controller (150) detects the user intent and sentiment, for example, as illustrated in Table 38.

TABLE 38

| User intent & action sentiment | |
|---|---|
| Interaction intent | Login with F-app |
| Action | App close -> Turn off F-app tracking blocker -> relaunch |
| User action sentiment | Login action with F-app -> POSITIVE<br>Login error -> NEGATIVE |

Furthermore, the privacy and utility correlation engine (153a) (not shown in FIG. 8) of the privacy and utility controller (150) determines the privacy protection characteristic of the user based on the generated feature, the determined content specific privacy profile, and the determined content specific utility preference of the user and co-relates the privacy protection characteristic with the application using the mapping engine (153b), for example, as illustrated in Table 39.

TABLE 39

| | |
|---|---|
| Anti-Tracking | Block 3rd party trackers in S-app, except F-app's domain |
| Profile isolation | App Sandboxing for data filtering only. No separate profile created. |
| Data obfuscation | Anonymization, Ad ID masking |

Then, the privacy and utility correlation engine (153a) stores co-relation in the privacy characteristics prediction store (153c). Then, at 804, the privacy and utility configuration controller (153d) (not shown in FIG. 5) of the privacy and utility controller (150) generates the one or more personalized settings for future user interaction based on co-relation, and the app data and network request-response filtering (153e) (not shown in FIG. 8) of the privacy and utility controller (150) automatically personalize the application of the electronic device (100) based on one or more generated personalized settings.

Figure 9:
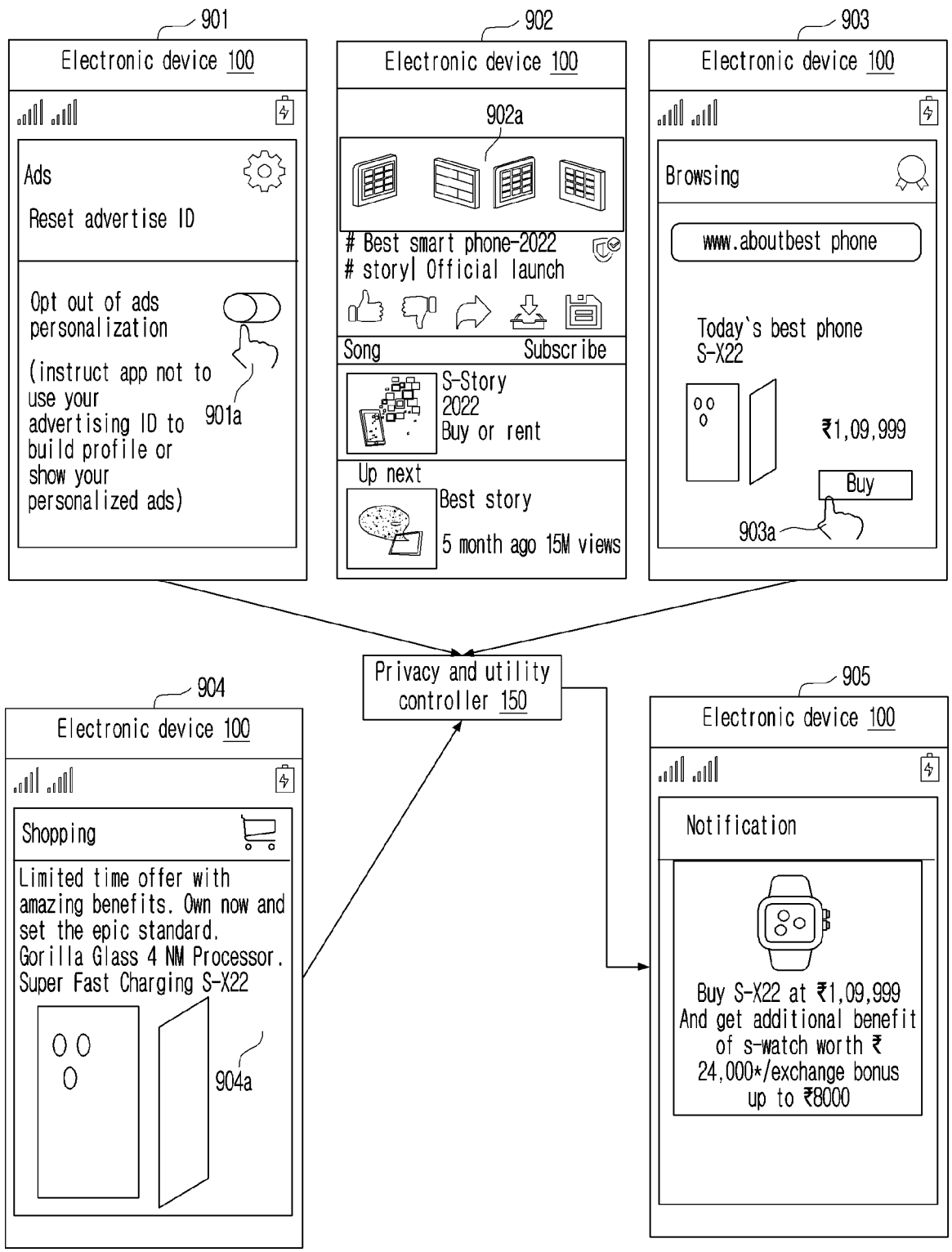
FIG. 9 is an example scenario illustrating an enhanced utility through a tracker blocking exemption for a non-privacy-sensitive content learned across applications, according to an embodiment of the disclosure.

FIG. 9 is an example scenario illustrating an enhanced utility through a tracker blocking exemption for a non-privacy-sensitive content learned across applications, according to an embodiment of the disclosure.

Consider a scenario in which the user of the electronic device (100) allows the maximum level of privacy protection, all tracking is disabled. As a result, the user does not receive tailored adverts or recommendations from third-party ad servers. The user was really interested in and wanted to purchase an S-X22 phone. The user viewed a video app review of the S-X22 phone, then searched and read review blogs on the Internet, and ultimately arrived at the product purchase page in the shopping app. The privacy and utility controller (150) identifies "S-X22 phone" as highly utility sensitive due to such cross-app journey over single topic and user attention, and prompts and obtains user authorization to share only the 'S-X22 phone' topic of interest. The privacy and utility controller (150) exempted tracking prevention for this purpose exclusively. Finally, due to ad-network access to the user's interest, the user received S-X22 phone Ads Offer on the notification panel. A step-by-step procedure (901-905) for the privacy protection exemption to avoid application login failure based on previous user interactions learning with multiple applications is described below.

Referring to FIG. 9, at 901, the system context monitoring (151a) determines the device context, for example, as illustrated in Table 40.

TABLE 40

| | |
|---|---|
| Screen size | Medium |
| Device operating mode | Personal |

The privacy and utility configuration monitoring (151b) determine the privacy configuration and the utility configuration (901a), for example, as illustrated in Table 41.

TABLE 41

| Privacy & Utility configuration state | |
|---|---|
| Privacy protection | High |
| Personalization | OFF |
| Advertising ID | Unique, NOT shared |

At 902, the app content monitoring (151c) determines the currently running application context (902a), for example, as illustrated in Table 42.

TABLE 42

| App content state | |
|---|---|
| App name | Internet, video app |
| Content-type | Smartphone review (Blog, Video) |
| App screen | Webpage, Video |

At 903, the user interaction monitoring (151d) (not shown in FIG. 9) of the privacy and utility controller (150) determines the user interaction across the application (903a) and is used to identify the user intent and the action categories along with user sentiment towards the displayed content on the screen (140) of the electronic device (100), for example, as illustrated in Table 43.

TABLE 43

| User interaction information | |
|---|---|
| Interaction trigger | video app & Web search |
| Interaction sequence with event-screen info | User types 'S-X22 Ultra review' in video app -> Click video (video app) -> Types same in web browser (D.Go search input) -> View link (search result) . . . -> click product link (shopping app) |
| User initiated content | Yes |

At 904, the app privacy and utility context modelling (152*a*) (not shown in FIG. 9) of the privacy and utility controller (150) receives input from the system context monitoring (151*a*), the privacy and utility configuration monitoring (151*b*), and the app content monitoring (151*c*). Furthermore, the app privacy and utility context modelling (152*a*) determine service provides features about content's (app/websites) privacy-related properties and users' content-specific privacy and utility requirements, for example, as illustrated in Table 44.

TABLE 44

| | |
|---|---|
| Current active app | Video app -> Internet -> shopping app |
| Visible Content Topic | S-X22 |
| App Privacy status | Cross-app tracking: BLOCKED, Support Incognito: NO |
| App Data sharing | None |

Furthermore, the privacy and utility controller (150) learns sensitivity labels, for example, as illustrated in Table 45.

TABLE 45

| | |
|---|---|
| User privacy sensitivity | Moderate |
| Privacy sensitive topic/scenario | 'Intimate wear' in 'Work' & 'Dex' mode |
| Utility sensitive topic/scenario | $3^{rd}$ party login with Facebook, Smartphone: S-X22 |

Furthermore, the user intent detection and action sentiment classification (152*b*) (not shown in FIG. 9) of the privacy and utility controller (150) detects the user intent and sentiment (904*a*), for example, as illustrated in Table 46.

TABLE 46

| User intent & action sentiment | |
|---|---|
| Interaction intent | 'Read product details', 'Purchase" |
| Action | 'Search', 'View', 'Engage' |
| User action sentiment | POSITIVE during search & view |

Furthermore, the privacy and utility correlation engine (153*a*) (not shown in FIG. 9) of the privacy and utility controller (150) determines the privacy protection characteristic of the user based on the generated feature, the determined content specific privacy profile, and the determined content specific utility preference of the user and co-relates the privacy protection characteristic with the application using the mapping engine (153*b*), for example, as illustrated in Table 47.

TABLE 47

| | |
|---|---|
| Anti-Tracking | Allow tracking of 'S-X22 interest only across apps |
| Profile isolation | Sandbox exemption for interest - 'S-X22' |
| Data obfuscation | Anonymization, Ad ID masking |

Then, the privacy and utility correlation engine (153*a*) stores co-relation in the privacy characteristics prediction store (153*c*). Then, at 905, the privacy and utility configuration controller (153*d*) (not shown in FIG. 9) of the privacy and utility controller (150) generates the one or more personalized settings for future user interaction based on co-relation, and the app data and network request-response filtering (153*e*) (not shown in FIG. 9) of the privacy and utility controller (150) automatically personalize the application of the electronic device (100) based on one or more generated personalized settings.

In another embodiment, the proposed method/the privacy and utility controller (150) provides privacy configuration recommendations in the web browser based on personalized learning of privacy awareness and risk. In the existing browsers/system, the web browser includes several privacy settings (e.g., anti-tracking, anti-fingerprinting, tracker resource blocking, $3^{rd}$ party cookie blocking, periodic cookie or another storage clearing, etc.). Some existing browsers include such detailed privacy settings even at the individual webpage level. Each of these settings works differently in the webpage and protects the user's privacy from different methods of tracking. If privacy protections are not turned on, it can cause privacy leakage, which includes at least leaking information about the websites user is visiting $3^{rd}$ parties along with user identifiers over the network. Such risk varies based on which web pages the user is visiting and how the user is interacting with the web pages. Applying all the privacy settings on each webpage can break web functionality. Hence most browsers do not enable all the privacy settings by default. Also due to technical complexity, common users find such privacy settings difficult to understand and apply. Individuals do not know which setting configuration would work best for them as per their usage. Therefore, most users do not change their 'default' privacy settings. This exposes most users to privacy risks.

At present, there is no prior solution that can learn users' privacy needs and recommend the privacy setting configurations according to the need. The proposed method/the privacy and utility controller (150) monitors the user's browser usage, webpage properties, and user interactions. The privacy and utility controller (150) determines the privacy awareness level of the user by considering the user's exposure to privacy features and interactions in the past and identifies privacy risk parameters associated due to his browsing pattern. Finally, the privacy and utility controller (150) predicts and recommends appropriate privacy configurations required to enhance his protection. Due to personalized learning, different configurations can be applied for different users based on different browsing situations dynamically.

In another embodiment, the proposed method/the privacy and utility controller (150) provides a balance between privacy and utility—interest-driven ads without leaking privacy-sensitive browsing history and other personally identifiable information. In the existing browsers/system, enabling privacy protections prevents tracking which ensures that the user's browsing history is not going out of the browser (or device). Therefore server-driven ads or recommendation engines do not receive user browsing interest information. Due to a lack of interest data, all ads become generic, making them less useful. On the other hand, disabling privacy settings allows $3^{rd}$ party tracking, thus interest-driven targeted ads can be seen. But this causes user's browsing history or even sensitive interest information to be leaked outside the browser or device, causing privacy violations. The proposed method/the privacy and utility controller (150) learns topics that are privacy-sensitive to the user (e.g., specific medical habits, dress with more skin exposure, etc.) and topics and scenarios which the user intends to get utility (e.g., $3^{rd}$ party commenting) or recommendation on-device. Thus, the privacy and utility controller (150) can bring a balance between privacy and utility by blocking sensitive interest data from going outside the app and allowing only user-consented interest data outside to fetch related ads.

In another embodiment, the proposed method/the privacy and utility controller (150) provides enhanced utility by automatic handling of functional breakages utilizing personalized learning and customized privacy protection. In the existing browsers/system, when privacy settings are turned on, it can cause functional errors due to restrictions applied over network requests, cookies, or other storage methods. Error situations can vary from user to user depending on their existing privacy configuration and how differently they interact with each webpage. When errors were caused on several websites (e.g., search application, social media application, etc.) in the existing browsers/system. Such error messages could not be understood by common users and they could not address the issue on their own. The actual root cause was one of its privacy-protecting features. Such issues resulted in lots of user VOCs, thereby creating a bad user experience with reduced utility due to privacy features. Upon further analysis, websites identified the cause. They suggested disabling the tracking prevention feature to address this issue, which users followed. This further exposed the users to privacy leakage as tracking was allowed due to disabling of the feature. At present, the existing methods are unable to handle such breakages automatically or learn and apply breakage prevention solutions to new web pages.

The proposed method/the privacy and utility controller (150) monitors app (e.g., browser) privacy setting status, app screen content, as well as user interactions, continuously and automatically trying to identify the cause of error by correlating privacy features and corresponding network and app status change. Once the probable cause and solution are identified, the privacy and utility controller (150) recommends the user apply a modified privacy configuration to address this issue. The privacy and utility controller (150) applies NLP on the webpage error message to identify that an abnormal situation has occurred during webpage load. From load and cookie store history, the privacy and utility controller (150) identifies that the webpage login was involved in the redirection loop and this domain is different than the main website domain, making it $3^{rd}$ party. Further, this login domain had cookie access blocked, which happened because of one of the internal features of the privacy setting. Thus, the privacy and utility controller (150) enables the cookie access temporarily to the login domain involved during the page load as part of the recommended resolution approach, which eventually fixes the issue. In some situations, the privacy and utility controller (150) may try several combinations to narrow down the solution approach which causes minimum exemption to the existing privacy settings. Thus unlike the existing browsers/system, where users had to wait several days to get some instructions to finally disable the privacy setting to address the issue, exposing them to privacy risk, our disclosure can identify the cause and possible solution immediately after a problem occurs, where only a portion of privacy setting is adjusted temporarily to address the issue without the need to disable complete privacy setting. Also, the privacy and utility controller (150) learns from previous occurrences of issues and methods taken to resolve the same by the user. The privacy and utility controller (150) automatically suggests a 'modified privacy configuration' to be applied temporarily when a similar scenario is detected on a new website. Thus, utility is enhanced without disabling privacy settings.

In another embodiment, the proposed method/the privacy and utility controller (150) provides app privacy configuration recommendations based on personalized learning of privacy awareness and risk. In the existing application/system, when the user is browsing an E-commerce app (e.g., shopping app), most user searches, views, or activities done within the app are visible and shared with the $3^{rd}$ parties that are present in the app. Many of these $3^{rd}$ parties are mainly involved in tracking user activity. These $3^{rd}$ parties can communicate to their server or other apps within the same device, facilitating cross-app tracking. Once user data goes out of the electronic device to tracker servers, it is beyond user control and privacy may already be compromised. The privacy risk of the user may vary depending on the $3^{rd}$ parties that are present within the application, the user's privacy awareness, and activities performed by the user. E.g., a privacy-conscious user may take the help of platform-level settings such as 'Opt-out of Ads personalization' or $3^{rd}$ party tracker blocker services to reduce tracking. However, such existing platform-level settings may not be sufficient or matching to the privacy expectation of the user. The $3^{rd}$ party tracker blocker may also cause failure in the normal operation of the application. Some users may use VPN-like services to protect privacy. But VPNs mainly prevent tracking by Internet Service Providers (ISP), but they may not protect against third-party tracking. Also, it may expose the user to track by VPN providers. At present, there is no prior solution that can learn user's privacy needs while operating individual applications and recommend specific privacy settings for individual applications according to the need.

The privacy and utility controller (150) monitors the user's app activities and interactions, app content properties, and privacy-related parameters. Based on the estimated privacy awareness and risk associated with a specific user, the privacy and utility controller (150) predicts and recommends appropriate privacy configurations required for the individual application to enhance the user's privacy protection without causing app failure.

In another embodiment, the proposed method/the privacy and utility controller (150) provides a balance between privacy and utility—interest-driven recommendation without leaking privacy-sensitive app visits. Privacy and utility sensitiveness varies from one user to another. A more liberal and open-minded person might be more willing to share information than a conservative or introverted person. For some users, even the same keyword 'depression relief tablets' may not be considered privacy sensitive and they may benefit if relevant recommendations about this topic are given to them. Therefore a pre-defined rule of selected topics marked for privacy sensitiveness cannot be applicable to all users. In the existing application/system, the 'App Tracking Transparency' solution provides the option to either completely allow or completely deny tracking on a per-app basis. It does not understand user's interests, neither has it differentiated on track based on individual app screens or activities. Thus either no user interest information is sent out of the device to $3^{rd}$ party server making all ads generic and less useful, or all user information is allowed to be sent to the server risking user privacy. Hence, the user can choose only one between privacy or utility, but not both at a time. There is no prior solution that monitors user interactions to understand user's privacy preferences to determine which screen might be privacy sensitive for a specific user and applies privacy configuration accordingly.

The privacy and utility controller (150) monitors user activities and interactions across various screens over time and associates the topic of the screen with such actions. E.g., certain topics of web pages or apps (e.g., medical topics) are only opened in secret mode or secret folder. Similarly, the user may close a popup or banner whenever the content of certain topics is seen on the same (e.g., ads with more skin exposure). The privacy and utility controller (150) may start with a pre-defined set of default privacy-sensitive topics and update the topics according to learning of user behaviour. Once the privacy and utility controller (150) identifies privacy-sensitive and utility-driven topics for a user, the privacy and utility controller (150) recommends a set of privacy configurations for the application (e.g., block cross-app and $3^{rd}$ party tracking, using the incognito feature in the app, etc.). The privacy and utility controller (150) tries to minimize tracking for all privacy-sensitive screens and allows topics related to utility to be tracked upon user consent. Thus it strikes a balance between privacy and utility for the user.

In another embodiment, the proposed method/the privacy and utility controller (150) provides enhanced transparency and control over user data. According to a recent survey, the most relevant topic among privacy-concerned users is tracking across applications, where a user's digital trail of information is built up making the user personally identifiable. They want clear status checks for invisible behaviour and tracking, and they want to manage them to be transparent. Users need objective help where they can make easy decisions and control the flow of personal information. Due to cross-app and $3^{rd}$ party-based tracking, if a user searches or views a video in a video application about 'Topic X', his social media app on the same or a different device might be aware of the same visit and show ads on 'Topic X'. Even sensitive topic-related interests also can be communicated across apps or to other $3^{rd}$ parties this way and severely violate user privacy. In the existing application/system, transparency and control over which data is collected and shared outside or across apps within a device are missing. Till now, the only control user could have, was to either completely allow or fully deny a particular application to track (e.g., App Tracking Transparency). Thus the user needs to sacrifice the utility and block all forms of tracking in an application even if he just wants to eliminate only specific privacy-sensitive interests. However, as mentioned already, such solutions do not provide finer control within the same app at individual screen level, according to the topic.

The privacy and utility controller (150) works as an on-device privacy platform component and monitors all the application screen content as well as user interactions onto it. The privacy and utility controller (150) gathers topics that the user has viewed or acted upon. Further, the privacy and utility controller (150) learns the user's privacy sensitivity by observing user interactions with the screen topics and also estimates content topics of more relevant user interest.

Finally, the privacy and utility controller (150) creates a dynamic dashboard of the on-device interests of the user, marked with privacy sensitivity and utility labels. Upon the user's consent, the sensitive topic-related content or screens are barred from cross-app or $3^{rd}$ party tracking, while utility-oriented topic-related content is allowed to be tracked. This dashboard is allowed to be modified by the user. At the same time, the topics and the privacy and utility labels are always updated according to the latest user behaviour. The privacy and utility controller (150) provides enhanced transparency and control over the user data as the user can view what type of user interests are allowed to be tracked. Any type of content to which the user has not consented is protected from tracking by applying the necessary privacy configuration.

In another embodiment, the proposed method/the privacy and utility controller (150) provides a balance between privacy and utility-interest-driven ads without leaking privacy-sensitive app interactions. Apart from above mentioned topic-level customization, along with platform and individual app-level, privacy configurations are also identified according to estimated user's privacy preference. Such configurations include but are not limited to blocking cross-app trackers, opt-out of ad personalization, advertising id resetting, app profile sandboxing, and recommending incognito mode for individual apps if supported, etc.

Finally, with the proposed method/the privacy and utility controller (150), the user can receive interest-driven ads without leaking privacy-sensitive app screen content and any user activity on top of it. Also similar to web and app use cases, in case of a functional error due to privacy protection such as $3^{rd}$ party data restriction or cross-app data filtering, the privacy and utility controller (150) learns from past failures and adjusts privacy protection configurations accordingly. This future scenario of failure is prevented with the recommendation in line with learning from past failures. In the existing application/system, the user needs to choose between privacy and utility. But with the proposed method, the user can get a balanced solution having both privacy and utility.

In another embodiment, there are several advancements in advertisement technology with the proposed method.

The proposed method/the privacy and utility controller (150) provides on-device personalization of users' privacy preferences. With advertisement networks, restrictions are not learned based on individual users' personal privacy preferences, instead, they are applied based on pre-set rules based on age, gender, or content type. Thus, the same rule is applied to all users given they belong to the same age, gender, or content bucket. However, the privacy sensitivity of one user can vary widely from another user. Some users are willing to share their browsing data instead of rewards (e.g., users are allowed to access paywall services when they share user data). On the other hand, users (e.g., journalists) belonging to a country where state surveillance is high, may want the highest privacy features. Topics of privacy sensitivity can also change depending on the personal, professional, or political situation. Our solution can understand different privacy preferences for different users due to on-device learning. Therefore, different restrictions can be applied even for the same age, gender, and content type.

The proposed method/the privacy and utility controller (150) provides improved transparency and privacy control. In the case of an advertisement network, the user does not know and cannot control which of his data was sent outside the device and used to provide a certain advertisement. The advertiser network learns or infers about the user's interest after his browsing history has already gone out of his device to the network. Due to this, the user's data has already been leaked without any control from the user. The proposed method/the privacy and utility controller (150) can bring transparency and control over user data in the device itself due to on-device learning of user interest and privacy preferences and filtering of learned privately labeled content types.

Due to a pre-defined rule-set or limits over content type restrictions, it may not be possible for an advertising network to apply restrictions on a completely new category that may not be part of the pre-defined list. In our solution, content categories and corresponding privacy labels are learned dynamically based on the user's browsing behaviour on-device. Therefore, our solution can adapt to any new category quickly without additional change.

The proposed method/the privacy and utility controller (150) applies necessary privacy configurations in the electronic device (100) so that the electronic device (100) fulfills the user's requirement considering his privacy awareness, risk, and sensitivity. It also handles functional errors that arise from privacy protections providing a balance between privacy (control over data sharing) and utility (i.e., functionality). Control over the type of advertisement is just one outcome of the proposed solution due to control over outgoing interest data.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for personalizing user data privacy associated with at least one application of the electronic device, the electronic device comprising:
    a memory;
    a processor; and
    a privacy and utility controller, operably connected to the memory and the processor, configured to:
        monitor over time one or more user interactions associated with the at least one application of the electronic device,
        determine a privacy parameter of a user and a utility preference of the user based on the monitored user interactions,
        generate a generic privacy profile of the user and a content specific privacy profile of the user based on the determined privacy parameter of the user and utility preference of the user,
        determine at least one privacy protection characteristic of the user based on of the generic privacy profile and the content specific privacy profile, and
        generate one or more personalized settings for at least one future user interaction associated with the at least one application of the electronic device based on the at least one privacy protection characteristic,
    wherein the privacy and utility controller is further configured to determine a content specific utility preference of the user based on a category of content recommendations to which positive user reaction is received, a category of content shared by the user, a content type where the user reduces or disables privacy protection to access certain functionality of the at least one application, and a type of content where certain permissions are allowed for certain functionality, and
    wherein the content specific privacy profile comprises the content specific utility preference.

2. The electronic device of claim 1,
    wherein the one or more user interactions across the at least one application is determined based on a device context of the electronic device, and
    wherein the device context comprises a type of the electronic device, a screen-type of the electronic device, and an operating mode of the electronic device.

3. The electronic device of claim 1, wherein the one or more user interactions across the at least one application is determined based on a privacy configuration of the electronic device based on an application-level privacy preference and a platform-level privacy preference.

4. The electronic device of claim 1, wherein the one or more user interactions across the at least one application is determined based on a utility configuration of the electronic device based on an application-level utility preference and a platform-level utility preference.

5. The electronic device as claimed in claim 1, wherein the one or more user interactions across the at least one application is determined based on an application context of the at least one application of the electronic device.

6. The electronic device of claim 5, wherein the application context of the at least one application of the electronic device is determined based on an application characteristic of a user-visited application content, and a utility characteristic of the user-visited application content.

7. The electronic device of claim 5, wherein the application context of the at least one application of the electronic device is determined based on the application characteristic displayed on a screen of the electronic device and at least one service associated with the at least one application.

8. The electronic device of claim 5, wherein the application context of the at least one application of the electronic device is determined based on a privacy characteristic of a user-installed application, and a utility characteristic of the user-installed application.

9. The electronic device of claim 1, wherein the one or more user interactions across the at least one application is used to identify at least one a user intent, an action category and a user sentiment towards the at least one application.

10. The electronic device of claim 9, wherein the privacy parameter of the user comprises a privacy awareness of the user, a privacy risk of the user, and a privacy sensitivity of the user.

11. The electronic device of claim 10, wherein the privacy awareness of the user is determined based on an application-level privacy preference, a platform-level privacy preference, a user interaction over privacy related information, and a user behavior over privacy preferences.

12. The electronic device of claim 10, wherein the privacy risk of the user is determined based on an application-level privacy preference, a platform-level privacy preference, a user interaction with a third-party service, a user input, and a privacy characteristic of a user-visited application content.

13. The electronic device of claim 10, wherein the privacy sensitivity of the user is determined based on a usage of an application-level privacy preference, a user interaction over an application-level privacy preference, a usage of a platform-level privacy preference, a user interaction over a platform-level privacy preference, a usage of privacy-focused applications, and a privacy-conscious browsing behavior.

14. The electronic device of claim 1, wherein the utility preference of the user is determined based on a usage of application-level privacy preference, a usage of platform-level privacy preference, and a utility-oriented browsing behavior.

15. The electronic device of claim 1, wherein the content specific privacy profile of the user is determined based on a category of content visited by the user under a specific privacy mode, a category of application accessed under a device level privacy mode, a category of content or application where data permission is restricted by the user, and a category of content to which negative user reaction is received.

16. The electronic device of claim 1,
wherein generate one or more personalized settings for the at least one future user interaction associated with the at least one application of the electronic device based on the at least one privacy protection characteristic comprises:
correlate the at least one privacy protection characteristic with the at least one application, and
generate the one or more personalized settings to automatically personalize the at least one application for the at least one future user interaction based on the at least one correlated privacy protection characteristic with the at least one application, and
wherein the one or more personalized settings comprises a privacy sensitivity configuration and a utility sensitivity configuration.

17. The electronic device of claim 1,
wherein the privacy and utility controller is further configured to:
automatically personalize at least one displayed content on a screen of the electronic device based on the generic privacy profile and the content specific privacy profile and a plurality of internal application parameters based on the generic privacy profile and the content specific privacy profile, and
wherein the plurality of internal application parameters does not change the at least one displayed content on the screen.

18. A method for personalizing user data privacy associated with at least one application of an electronic device, the method comprising:
monitoring over time, by the electronic device, one or more user interactions associated with the at least one application of the electronic device;
determining, by the electronic device, a privacy parameter of a user and a utility preference of the user based on the monitored user interactions;
generating, by the electronic device, a generic privacy profile of the user and a content specific privacy profile of the user based on the determined privacy parameter of the user and utility preference of the user;
determining, by the electronic device, at least one privacy protection characteristic of the user based on the generic privacy profile and the content specific privacy profile; and
generating, by the electronic device, one or more personalized settings for at least one future user interaction associated with the at least one application of the electronic device based on the at least one privacy protection characteristic,
wherein the method further comprising:
determining a content specific utility preference of the user based on a category of content recommendations to which positive user reaction is received, a category of content shared by the user, a content type where the user reduces or disables privacy protection to access certain functionality of the at least one application, and a type of content where certain permissions are allowed for certain functionality, and
wherein the content specific privacy profile comprises the content specific utility preference.

19. The method of claim 18, wherein the one or more user interactions associated with the at least one application is used to identify at least one a user intent, an action category and a user sentiment towards the at least one application, the monitoring including a user skipping entering information in a form or and masking certain personal information while sharing.

* * * * *